United States Patent
Camps et al.

(10) Patent No.: US 10,602,309 B2
(45) Date of Patent: Mar. 24, 2020

(54) SYSTEM AND METHOD FOR WIRELESS DEVICE DETECTION, RECOGNITION AND VISIT PROFILING

(71) Applicant: Datavalet Technologies, Montreal (CA)

(72) Inventors: Tom Camps, Stittsville (CA); Ron Spencer, Ottawa (CA); Brad Gagne, Kanata (CA); Bennett Kanuka, Ottawa (CA); Rob Madge, Kanata (CA); Ray Scobie, Stittsville (CA); Don Campbell, Manotick (CA)

(73) Assignee: Datavalet Technologies, Montreal (CA)

( * ) Notice: Subject to any disclaimer, the term of this patent is extended or adjusted under 35 U.S.C. 154(b) by 118 days.

(21) Appl. No.: 15/870,630

(22) Filed: Jan. 12, 2018

(65) Prior Publication Data

US 2018/0139579 A1    May 17, 2018

Related U.S. Application Data

(63) Continuation of application No. 14/460,634, filed on Aug. 15, 2014, now abandoned, which is a continuation-in-part of application No. 13/666,784, filed on Nov. 1, 2012, now Pat. No. 9,003,488.

(30) Foreign Application Priority Data

Aug. 16, 2013   (CA) .................................... 2823895

(51) Int. Cl.
*H04W 4/02*    (2018.01)
*H04W 24/08*   (2009.01)
*H04W 12/06*   (2009.01)
*H04W 84/12*   (2009.01)

(52) U.S. Cl.
CPC ........... *H04W 4/023* (2013.01); *H04W 12/06* (2013.01); *H04W 24/08* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,266,383 | B2 | 9/2007 | Anderson |
| 7,546,276 | B2 | 6/2009 | Randle et al. |
| 7,610,049 | B2 | 10/2009 | Watanabe |
| 7,974,946 | B2 | 7/2011 | Meesseman |
| 8,024,567 | B2 | 9/2011 | Han |
| 8,151,319 | B2 | 4/2012 | Dhand et al. |
| 8,156,246 | B2 | 4/2012 | Short et al. |
| 8,166,524 | B2 | 4/2012 | Sentinelli |
| 8,391,909 | B2 | 3/2013 | Stewart |
| 9,003,488 | B2 | 4/2015 | Spencer et al. |
| 9,066,227 | B2 | 6/2015 | Spencer et al. |
| 9,203,840 | B2 | 12/2015 | Spencer et al. |

(Continued)

FOREIGN PATENT DOCUMENTS

WO    WO 03/077572 A1    9/2003

*Primary Examiner* — Noel R Beharry
*Assistant Examiner* — Richard Schnell
(74) *Attorney, Agent, or Firm* — Knobbe, Martnes, Olson & Bear, LLP

(57) ABSTRACT

Described are various embodiments of a system and method in which device-identifying data can be used to uniquely recognize and optionally track and report on device activity at one or more Wi-Fi locations by way of the creation and management of a device and/or visit profile uniquely associated with such devices and stored in a network accessible knowledge base.

11 Claims, 15 Drawing Sheets

(56) References Cited

U.S. PATENT DOCUMENTS

| | | |
|---|---|---|
| 2002/0078059 A1 | 6/2002 | Urera |
| 2002/0103801 A1 | 8/2002 | Lyons |
| 2002/0116266 A1 | 8/2002 | Marshall |
| 2002/0173981 A1 | 11/2002 | Stewart |
| 2002/0176579 A1 | 11/2002 | Deshpande et al. |
| 2003/0031154 A1 | 2/2003 | Kobayashi et al. |
| 2003/0115288 A1 | 6/2003 | Ljubicich et al. |
| 2003/0233458 A1 | 12/2003 | Kwon et al. |
| 2004/0181692 A1 | 9/2004 | Wild et al. |
| 2004/0203748 A1 | 10/2004 | Kappes et al. |
| 2004/0235455 A1 | 11/2004 | Jiang |
| 2005/0003828 A1 | 1/2005 | Sugar et al. |
| 2005/0015432 A1 | 1/2005 | Cohen |
| 2005/0021781 A1 | 1/2005 | Sunder et al. |
| 2005/0038744 A1 | 2/2005 | Viijoen |
| 2005/0053296 A1 | 3/2005 | Srinivasan et al. |
| 2005/0060456 A1 | 3/2005 | Shrader et al. |
| 2005/0216300 A1 | 9/2005 | Appelman et al. |
| 2005/0216550 A1 | 9/2005 | Pasemen et al. |
| 2005/0239445 A1 | 10/2005 | Karaoguz et al. |
| 2005/0242928 A1 | 11/2005 | Kirkeby |
| 2006/0053296 A1 | 3/2006 | Busboom et al. |
| 2006/0073788 A1 | 4/2006 | Halkka et al. |
| 2006/0182045 A1 | 8/2006 | Anderson |
| 2006/0236105 A1 | 10/2006 | Brok et al. |
| 2006/0265507 A1 | 11/2006 | Banga et al. |
| 2007/0006291 A1 | 1/2007 | Barari et al. |
| 2007/0113269 A1 | 5/2007 | Zhang |
| 2007/0124490 A1 | 5/2007 | Kalavade et al. |
| 2007/0150603 A1 | 6/2007 | Crull et al. |
| 2007/0156537 A1 | 7/2007 | Peters |
| 2007/0204027 A1 | 8/2007 | Shih et al. |
| 2008/0031211 A1 | 2/2008 | Kalavade et al. |
| 2008/0039102 A1 | 2/2008 | Sewall et al. |
| 2008/0051029 A1 | 2/2008 | Witteman et al. |
| 2008/0119276 A1 | 5/2008 | Alderucci |
| 2008/0151847 A1 | 6/2008 | Abujbara |
| 2008/0152099 A1 | 6/2008 | Bilstad et al. |
| 2008/0195741 A1 | 8/2008 | Wynn et al. |
| 2009/0046677 A1 | 2/2009 | Toledano et al. |
| 2009/0064283 A1 | 3/2009 | Chen |
| 2009/0070412 A1 | 3/2009 | D'Angelo et al. |
| 2009/0070859 A1 | 3/2009 | Mathur et al. |
| 2009/0080542 A1 | 3/2009 | Julian et al. |
| 2009/0081992 A1 | 3/2009 | Choi et al. |
| 2009/0157513 A1 | 6/2009 | Bonev et al. |
| 2009/0249458 A1 | 10/2009 | Banga et al. |
| 2009/0282144 A1 | 11/2009 | Sherrets et al. |
| 2009/0300722 A1 | 12/2009 | Haverinen et al. |
| 2010/0095359 A1 | 4/2010 | Gordon |
| 2010/0107225 A1 | 4/2010 | Spencer et al. |
| 2010/0241652 A1 | 9/2010 | Fasihuddin et al. |
| 2010/0275267 A1 | 10/2010 | Walker et al. |
| 2010/0306099 A1 | 12/2010 | Hirson et al. |
| 2011/0137814 A1 | 6/2011 | Stewart |
| 2012/0192258 A1 | 7/2012 | Spencer et al. |
| 2013/0167196 A1 | 6/2013 | Spencer et al. |
| 2013/0190010 A1 | 7/2013 | Chiou et al. |
| 2013/0267255 A1 | 10/2013 | Liu et al. |
| 2014/0355592 A1 | 12/2014 | Camps et al. |
| 2015/0113621 A1 | 4/2015 | Glickfield et al. |
| 2015/0230100 A1 | 8/2015 | Atia et al. |
| 2016/0073252 A1 | 3/2016 | Spencer et al. |

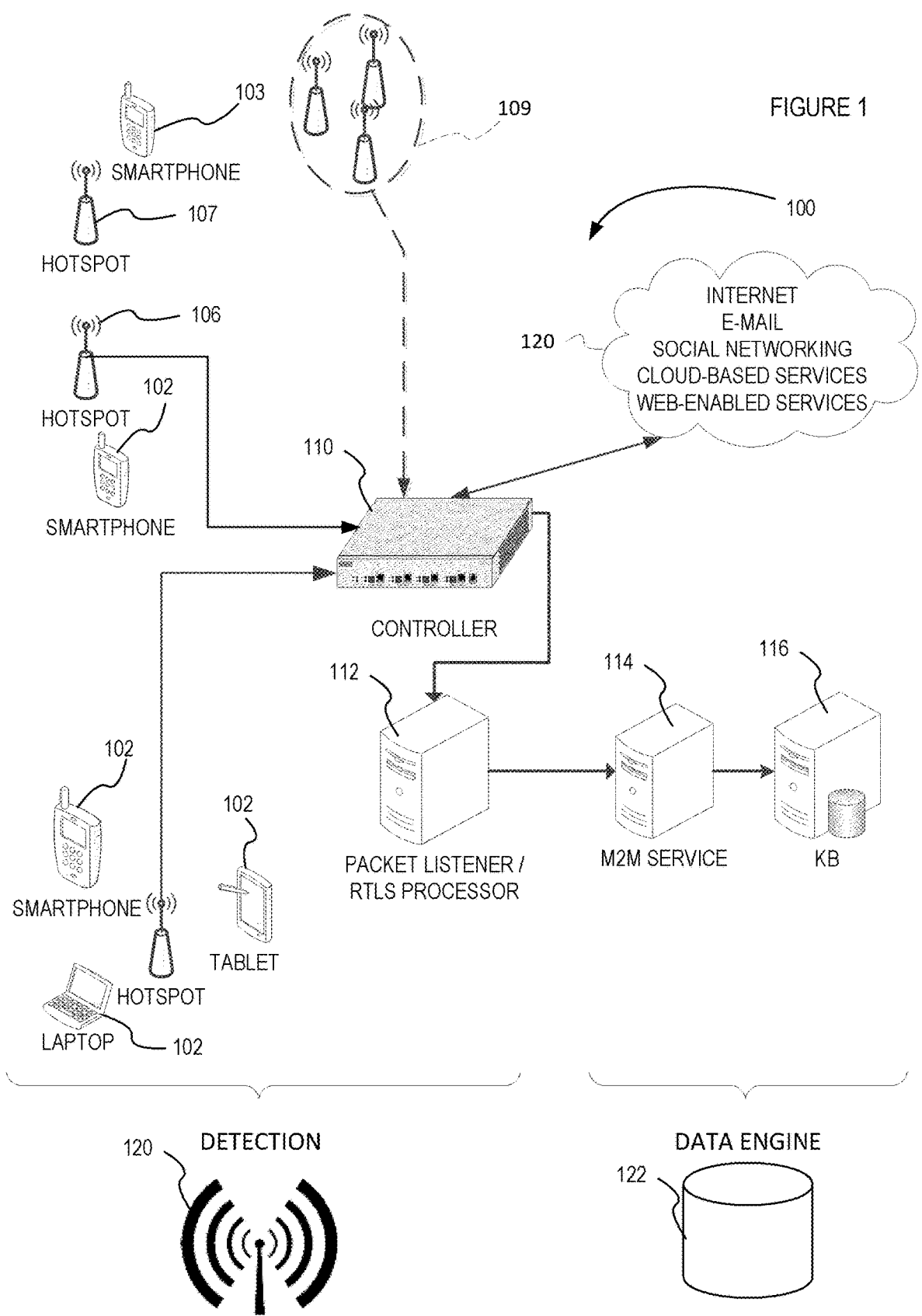

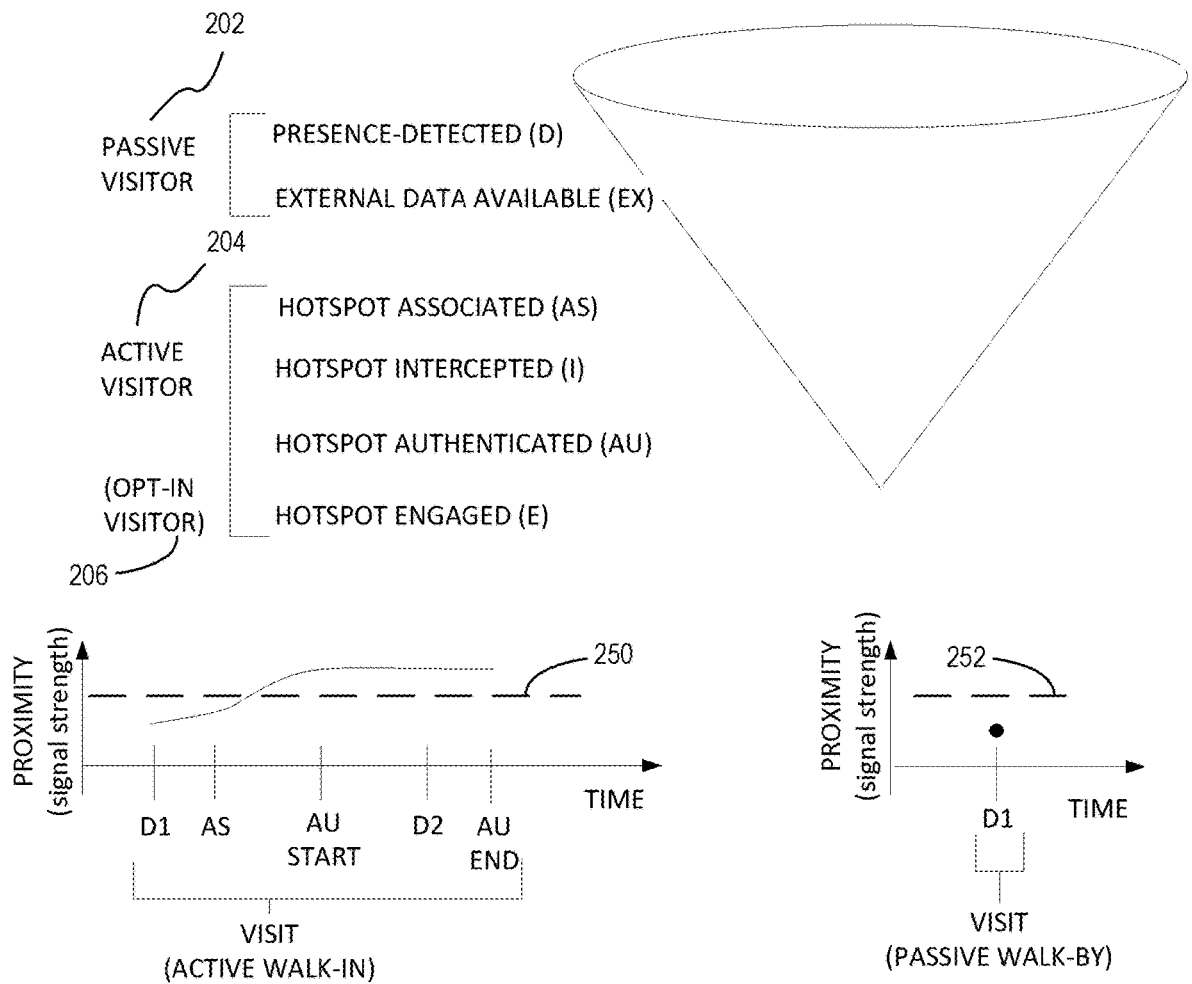
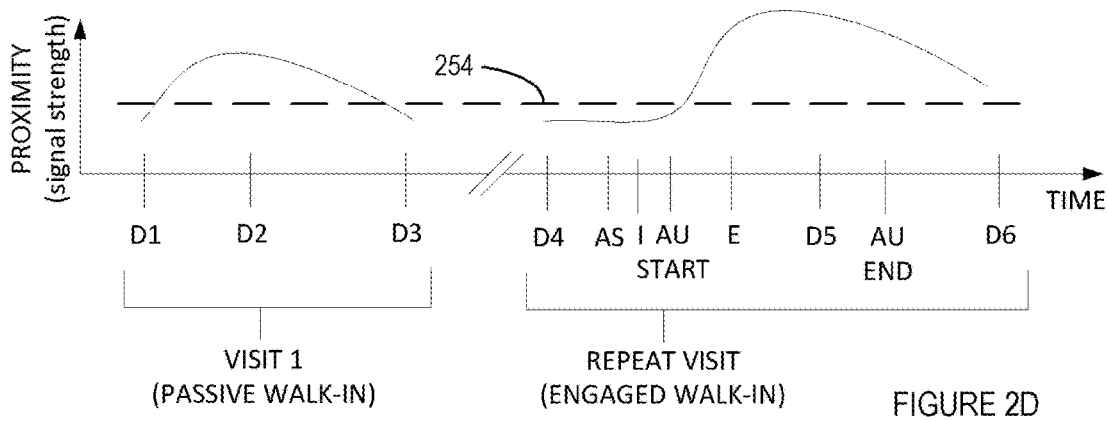

SYSTEM AND METHOD FOR WIRELESS DEVICE DETECTION, RECOGNITION AND VISIT PROFILING

RELATED APPLICATIONS

The present application is a Continuation U.S. application Ser. No. 14/460,634 filed Aug. 15, 2014, which is a Continuation-in-Part of U.S. application Ser. No. 13/666,784 filed Nov. 1, 2012, and which claims priority to Canadian Application No. 2823895 filed Aug. 16, 2013. The entire contents of these prior applications are hereby incorporated by reference. In addition, although the present application does not claim priority to U.S. application Ser. Nos. 12/451,909 and 60/942,409, the entire contents of these applications are also incorporated by reference.

FIELD OF THE DISCLOSURE

The present disclosure relates to wireless networks, and in particular, to a system and method for wireless device detection, recognition and visit profiling.

BACKGROUND

Wireless devices and systems are currently available for enabling a user of a wireless device access to a communication network (e.g. the Internet) via a wireless access point (WAP) and gateway communicatively linked to this communication network, for example, operated at a given location or in a given area commonly known as a hotspot.

This background information is provided to reveal information believed by the applicant to be of possible relevance. No admission is necessarily intended, nor should be construed, that any of the preceding information constitutes prior art.

SUMMARY

The following presents a simplified summary of the general inventive concept(s) described herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

There is a need for a system and method for wireless device detection, recognition and/or profiling. Some aspects of this disclosure provide such a system and method.

In accordance with one aspect, there is provided a method for automatically characterizing a device visit by a wireless device at or near a Wi-Fi location, comprising: detecting a first wireless transmission via a receiver at the Wi-Fi location; automatically extracting a unique device identifier from said first wireless transmission; associating a visit profile with said extracted unique device identifier based at least on detection of said first transmission; tracking one or more subsequent wireless transmissions associated with the wireless device via said visit profile; and characterizing the device visit of the wireless device at or near the Wi-Fi location as a function of said visit profile.

In accordance with another aspect, there is provided a method for automatically characterizing a visit of a wireless device at or near a wireless hotspot, comprising: detecting one or more wireless transmissions via a receiver operated at the wireless hotspot; automatically extracting a unique device identifier from each of said one or more wireless transmissions; associating a visit profile with said unique device identifier based on said one or more detected wireless transmissions; and characterizing the visit as a function of said visit profile.

In accordance with another aspect, there is provided a system for tracking wireless device visits at a wireless hotspot location, comprising: a receiver located at the wireless hotspot location; a data storage device; and a data processor operable to: extract unique device identifiers from wireless transmissions received by said receiver; track wireless transmissions received by said receiver associated with a same wireless device using said extracted unique device identifiers; and profile respective device visits as a function of said tracked wireless transmissions.

In accordance with another aspect, there is provided a system for automatically characterizing a device visit by a wireless device at or near a Wi-Fi location, comprising: means for detecting a first wireless transmission at the Wi-Fi location; means for automatically extracting a unique device identifier from said first wireless transmission; means for associating a visit profile with said extracted unique device identifier based at least on detection of said first transmission; means for tracking one or more subsequent wireless transmissions associated with the wireless device via said visit profile; and means for characterizing the device visit of the wireless device at or near the Wi-Fi location as a function of said visit profile.

In accordance with another aspect, there is provided a method for automatically characterizing a visit of a wireless device at or near a wireless hotspot location via a receiver operated within the location, comprising: detecting one or more wireless transmissions from the wireless device via the receiver operated at the wireless hotspot location; extracting a unique device identifier from each of said one or more wireless transmissions; tracking a visit profile of the wireless device via said unique device identifier; processing said visit profile against one or more preset visit characterization criteria defined for the wireless hotspot location to discriminate between two or more designated visit classifications; and characterizing the visit as being consistent with one of said designated visit classifications based on said processing.

In accordance with another aspect, there is provided a method for automatically discriminating between walk-in wireless devices and walk-by wireless devices at a Wi-Fi location, the method comprising: detecting a wireless transmission from a given wireless device via a Wi-Fi receiver operated within location; processing a signal strength of said wireless transmission against a designated signal strength signature of the location, said signature classifying signal strengths as representative of wireless signals emanating from at least one of wireless devices operated within the location and those outside the location; and characterizing said given wireless device as one of a walk-in device and a walk-by device as a function of said signal strength signature.

In accordance with another aspect, there is provided a method for automatically identifying a wireless device as being physically located at a Wi-Fi location and within or outside a physical boundary at least partially defining this location, the method comprising: detecting a wireless transmission from the wireless device via a receiver operated within the physical boundary; processing a signal strength of said wireless transmission against a preset signal strength signature of the location defining one or more signal strength criteria for discriminating between signal strengths predominantly associated with devices operated from within the physical boundary, from those predominantly associated with devices operated from outside the physical boundary; and identifying the device as being within or outside the physical boundary based on said processing.

In accordance with another aspect, there is provided a system for automatically classifying wireless device visits at or near a wireless hotspot location, comprising: a receiver operated from within the wireless hotspot location; a data storage device; and a data processor operable to: extract unique device identifiers from wireless transmissions received by said receiver from wireless devices operated at or near the hotspot location; track, in said data storage device, respective visits from each of said wireless devices via said extracted unique device identifiers; record, in said data storage device, indication of at least one of a visit duration and a received signal strength for each of said tracked wireless devices; and classify each of said respective visits as a function of said indication.

In accordance with another aspect, there is provided a method for automatically characterizing a visit of a wireless device at or near a wireless hotspot, comprising: detecting one or more wireless transmissions via a receiver operated at the wireless hotspot; automatically extracting a unique device identifier from each of said one or more wireless transmissions; associating a visit profile with said unique device identifier based on said one or more detected wireless transmissions; and characterizing the visit as a function of said visit profile.

In accordance with another aspect, there is provided a computer-readable medium having statements and instructions stored therein for implementation by a processor to automatically discriminate between wireless signals received by a Wi-Fi receiver operated at a location from wireless devices operated from within a physical boundary at least partially defining this location, from those wireless devices operated from outside the physical boundary, by: receiving as input a signal strength value associated with a given wireless transmission; comparing said signal strength value against a preset signal strength signature of the location defining a signal strength criteria for discriminating between signal strengths predominantly associated with devices operated from within the physical boundary, from those predominantly associated with devices operated from outside the physical boundary; and identifying said given wireless transmission has having been transmitted from a device operated from within or outside the physical boundary based on said comparing.

In accordance with another aspect, there is provided a system for automatically discriminating between wireless signals received by a Wi-Fi receiver operated at a location from wireless devices operated from within a physical boundary at least partially defining this location, from those wireless devices operated from outside the physical boundary, comprising: means for receiving as input a signal strength value associated with a given wireless transmission; means for comparing said signal strength value against a preset signal strength signature of the location defining a signal strength criteria for discriminating between signal strengths predominantly associated with devices operated from within the physical boundary, from those predominantly associated with devices operated from outside the physical boundary; and means for identifying said given wireless transmission has having been transmitted from a device operated from within or outside the physical boundary based on said comparing.

Other aspects will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein:

FIG. 1 is a diagram of an exemplary system hardware architecture for device detection and recognition, in accordance with one embodiment of the invention;

FIG. 2A is a high-level diagram depicting progressively increasing engagement levels between a wireless device and a hotspot, and distinguishing passive and active visitors at this hotspot as a function of their engagement level, in accordance with an embodiment of the invention;

FIGS. 2B to 2D are diagrammatic representations of respective visit profiles, in accordance with an embodiment of the invention, in which different device detection and network interaction events are used to characterize each visit.

DETAILED DESCRIPTION

Figure 3:
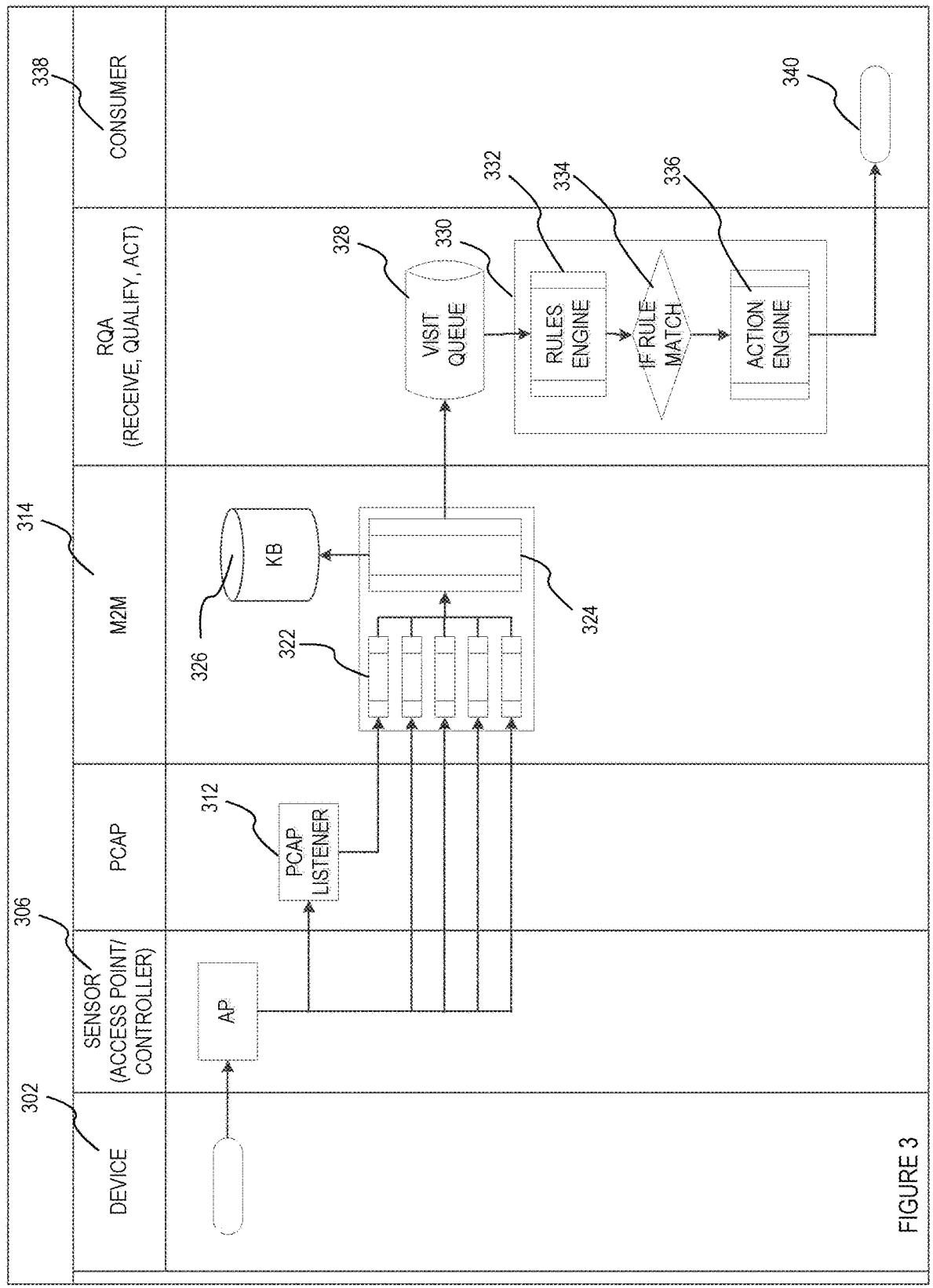
FIG. 3 is a diagram of an exemplary process flow for device detection and recognition, visit data compilation and processing related thereto, and downstream applications associated therewith, in accordance with one embodiment of the invention.

The systems and methods described herein provide, in accordance with different embodiments, different examples in which device-identifying data can be used not only to manage wireless network access at different hotspot locations by remote devices at such locations, but also, or alternatively, to uniquely identify, recognize and optionally track and report on (e.g. profile) device activity. For example, device/user activity may be profiled for a given hotspot, group of associated or otherwise related hotspot locations and/or over an entire network of accessible hotspot locations, by way of the creation and management of respective device profiles uniquely associated with each identified device at this/these hotspot location(s) and stored in a local and/or network accessible knowledge base. For example, while previous systems have been deployed to provide wireless devices access to network services (e.g. Internet and/or Web-based services), for example in the context of publicly accessible wireless access points (WAP) and/or public hotspot locations, the examples provided herein may further or alternatively, in accordance with some embodiments, enable such access points/hotspots to facilitate identification, recognition, and optionally profiling of wireless devices frequenting or at least approaching locations associated with these network access points. Accordingly, devices interfacing with a wireless access point (WAP) or the like at a given hotspot location supported and/or serviced by a system as described herein, may, in some embodiments, be automatically identified and recognized by the system, and optionally, their activity profiled for downstream analysis and/or processing.

In some embodiments, a unique device identifier may be automatically embedded within a device transmission, in some examples without user input, and thus communicated by the device to a system-supported WAP. Upon the system cross-referencing this device identifier with device profiles stored at a local or common network accessible knowledge base, a match can be made and the device ultimately recognized. In some embodiments, upon identifying an unrecognized device, a new device profile may be created from the unique device identifier extracted from communications received from this unrecognized device, thus allowing for subsequent recognition, and thus optionally tracking, of this particular device. From these compiled device profiles, device usage patterns (usage time, location, frequency, etc.) can be logged and reported, for example. Similarly, recurring visits from a same device may be compiled in a user profile, and/or multiple recognizable events associated with a same device during a same "visit" at a given hotspot location may be compiled in a visit profile to characterize the user of the device, or again characterize an overall usage or visit trend(s) at this location from multiple device visit profiles.

Within this context, a given device can be recognized as a returning device when subsequently identified at a same location, thus indirectly identifying the user of this device as a potentially frequent or loyal customer. Similarly, a given device may be recognized upon identification at one of multiple hotspot locations having common access to the network accessible knowledge base. In one such embodiment, frequent or loyal customers (or at least their device), can be recognized across multiple hotspot locations, for example grouped or otherwise associated with a common operator, brand, business entity, or the like. Various applications, such as the tracking and reporting on repeat devices, the provision of improved services or offerings to such repeat devices, and other such applications as exemplified below, may be derived from the ability to identify and recognize devices across multiple hotspot locations, in some embodiments, without user input, that is in some cases, unbeknownst to the user of the device.

Similarly, the automatic compilation of visit profiling data, in some embodiments implemented without user input or action (i.e. unbeknownst to the visiting device users), may provide useful metrics in qualifying and/or quantifying user traffic, patronage, loyalty, trends and the like at the monitored hotspot location, across a group of associated or otherwise related hotspot locations, or again in the context of system-wide analytics in respect of multiple, potentially otherwise unrelated hotspot locations.

These and other applications will be described in greater detail below, in a non-restrictive manner, with reference to the below description of exemplary embodiments.

With reference now to FIG. 1, and in accordance with one embodiment, an example of a system 100 configured to allow for remote device recognition and/or profiling will now be described. The system 100 is generally configured to provide remote or wireless devices 102 access to network services, such as, but not limited to Internet, e-mail, social networking, etc. via network/cloud 120, from a public (or private) hotspot location 106 or the like (generically and interchangeably referred to herein as comprising/implementing a network access module, e.g. a WAP and gateway). In this particular example, the system 100 is configured to authorize full access privileges to authenticated users (for simplicity), though it will be appreciated that restricted access or access to only some services may also be considered, for example as described in International Application Publication No. WO 2008/148191, the entire contents of which are hereby incorporated herein by reference. For instance, while the below examples focus on wide-open access services, whereby a user of a remote device may be provided with unrestricted access to hotspot network access services, similar examples will be readily apparent to the person of ordinary skill in the art where user identification, authentication and authorization procedures may be implemented in the context of pay-per-use or limited/restricted hotspot network access services, for example.

Wireless devices 102 within the context of this application will be understood to broadly encompass devices having the ability to communicate with other devices without having physical contact with them. A wireless device in this context can be an electronic device operable as a wireless interface between a user or another electronic device and a wireless access point, such as provided at a hotspot or within a wireless network coverage area. A remote device may include, but is not limited to, laptops, tablets, personal digital assistant, smart phones (e.g. Apple™ iPhone™, HTC S261, Blackberry™ Q10, etc.), wireless gaming devices such as the Nintendo DS™, the Sony PSP™, the Sony Mylo™, Wi-Fi Cameras, portable entertainment devices (e.g. Apple™ iPod™, iPod™ Touch), and other such devices currently available on the market, in development, or upcoming and based on similar communication platforms and technologies. A remote device may incorporate several functionalities such as those listed above. A remote device can be capable of communicating using one or more different communication modes, such as a combination Wi-Fi and/or cellular device. The person skilled in the art will appreciate that the system 100, as disclosed herein, is readily adaptable to new and upcoming devices, and as such, is considered to include such devices within the context of the present disclosure.

In this context, a remote device 102 may thus generally comprise a computer-readable medium or media for storing statements and instructions for the operation of the remote device, and optionally for storing various forms of data useful in the implementation of remote device functions and/or accessible to the user of the remote device as needed; a communication means such as a communication device and/or interface for interfacing with the network access module 106 and optionally, for direct communication with other similarly configured remote devices; one or more processors for processing received and sent information and for implementing statements and instructions stored on the one or more computer-readable media; and a user interface (UI), such as a graphical user interface (GUI), keyboard, keypad, game pad, mouse, scroll ball, touch screen, motion sensing user interface, speech recognition system, or the like for receiving input from the user directed to the operation of the remote device 102. Other remote device elements and/or components, as would be readily apparent to the person skilled in the art, may also be considered herein without departing from the general scope and nature of the present disclosure. For instance, various hardware, firmware and/or software may be integrated or operationally associated with a given remote device 102 to achieve various functions and interface with the user and/or various services accessed thereby over the network 103. Also, various peripheral devices, such as supplemental user interfaces, data input and/or output means (e.g. printers, scanners, removable storage media, etc.), and the like may also be considered herein.

For the purpose of illustrating some of the device recognition and tracking features described below, in accordance with some embodiments, the system 100 of FIG. 1 is generally subdivided into a detection component 120 and a data engine component 122. In one embodiment, the detection component 120 allows for remote devices 102 in the vicinity of a given hotspot 106 to be detected and automatically identified by way of a unique device identifier automatically embedded, in some embodiments without user input, within a device transmission. The data engine component(s) 122 then allow for processing device identities, optionally in combination with time and location data, to provide for device recognition, tracking and other such features, as introduced above and as further exemplified below.

In this particular example, the detection component 120 comprises one or more hotspot radio receivers 106, such as a WAP or other such wireless sensor, which receives wireless transmissions from the devices 102 in its vicinity and communicates these transmissions to a centralized controller 110 (e.g. via a gateway). In some embodiments, multiple radio receivers 106 may be operated within a same location, however it is contemplated that downstream signal processing may be adapted to provide the various features, functions and results discussed below from signals received from a single radio receiver 106 located at each of the system's monitored locations.

The controller 110 (an example of which may include, but is not limited, to an Aruba 3200 Controller) is generally configured to relay raw transmissions received by different hotspot sensors 106 to a listener 112, which generally comprises one or more dedicated software modules that extract one or more unique device identifiers from these transmissions for use downstream in identifying and recognizing devices during subsequent visits at a same or other hotspot associated with system 100. In this particular embodiment, the listener 112 is generally characterized as a packet listener (e.g. implemented in the context of packet capture—PCAP), but may also be characterized as a Real Time Tracking System (RTLS) processor in which an RTLS data stream is processed to extract similar data, and optionally, provide access to signal strength data in further characterizing proximity of an identified device. Other such listeners currently available or that may evolve in the field to provide similar functionality will be understood to fall within the general scope and nature of the present disclosure.

In some embodiments, the unique device identifier comprises a value representative of an inherent characteristic of the device, such as a MAC address, that is automatically embedded within device transmissions without user input, and in most cases, unbeknownst to the user. Namely, the unique identifier extracted by the system 100 is generally specific to the device itself and not pre-designated for the purpose of wireless network access or user identification (e.g. distinct from user, device and/or service-specific username/password data), but rather integral to the device itself in identifying this device, for example, in allowing for the addressing of wireless communications thereto by nearby or associated devices.

In one such embodiment, the hotspot 106 is programmed to listen for probe requests transmitted by devices actively scanning for available networks. These types of packets are periodically broadcast by Wi-Fi client devices (part of the IEEE 802.11 standard) in seeking to identify available network connections. Contained in such probe requests is a value that uniquely identifies each device (its MAC address) so that replies can be addressed specifically to that device. In this particular embodiment, the hotspot sensor 106 forwards identified probe requests to a centralized controller 110 (e.g. delivered in its raw form to a remote server) for processing by listener 112.

In this particular embodiment, the packet listener 112 listens for incoming packets and extracts the MAC address of the client device 102 that originally issued the probe request, the IP address of the access point (sensor) 106 that detected the packet, and the timestamp of the packet, for example. In this example, extraction of the MAC address allows for unique identification of the device 102 at the hotspot 106, and extraction of the IP address and time stamp allows, in some embodiments, for the identification of the hotspot location and thus the identified device's location, and the time to be associated therewith. For instance, the IP address can be cross-referenced with a database of known access points to determine which location it corresponds to. Similarly, the extracted device identifier can be cross-referenced with stored device profiles such that repeat visitors can be recognized upon subsequent visits to the same or related locations, or again at unrelated locations for the purpose of expanding the device profile database across multiple operators (device profile sharing rules between entities may be set in place to protect user privacy and the like, as will be readily appreciated by the person of ordinary skill in the art). Combination of the device ID, location ID, and timestamp thus provides an indication that a particular device 102 was present at a particular location at a particular time.

In one embodiment, the extracted data can be used to recognize and thus track devices over time at different locations, and can also be used to generate and maintain an in-memory map of where each recognised device is, and optionally how long it has been there. From this point, the data can be sent, for example at regular intervals, to a machine to machine (M2M) service module 114 that aggregates packet capture data, optionally with other forms of presence information, to create a high-level picture of which devices are present at which locations, and for how long. This information can be stored in a knowledge base (KB) database 116 from where it can be used for various purposes such as reporting, business analytics, and diagnostics, to name a few. The M2M module 114 may also be used to pass events to external subscribers for real-time notification and/or reporting, for example.

In some embodiments, device identification and recognition, device profiling, and as will be described in greater detail below, device visit profiling, may be implemented internally by a given entity operating a local, regional or global hotspot locations (e.g. at a single location, at any of a group of commonly operated regional locations, and/or globally across multiple locations), or again implemented by a third party hotspot operator, which may service multiple hotspot operating entities in providing each one with respective and customized data in respect of devices identified/recognized at their service locations and/or across the entire serviceable network of hotspots.

In the context of FIG. 1, third party operations may thus share resources between commonly operated hotspot locations, or again between distinct customers, by centrally processing packet captures and/or other detection events (e.g. RTLS), or again by centrally processing event data in compiling respective visit profiles, managing device profiles across multiple customer platforms, and managing respective rules engines (e.g. see FIG. 3) for different consumers in delivering customized data, as appropriate. In such embodiments, again, privacy regulations may be implemented to limit exchange of data between consumers, for example where different levels of engagement have been recorded for a given device from consumer to consumer (e.g. an opt-in device may authorize access to personal information in respect of a particular hotspot operator, but may be set to operate anonymously in respect of another).

Similarly, while third party resources may be used exclusively for the provision of hotspot network access and device data acquisition and processing, leaving downstream application implementation to the consumer, other embodiments may redirect consumer actions back through the third party system for direct interaction with user devices. Either way, different privacy protocols may be implemented to reduce direct user device exposure to the consumer, thereby protecting a user's privacy and anonymity, particularly where a user's device's interactions have been limited to unsolicited packet captures, or the like. In such examples, a MAC address automatically extracted from anonymous device transmissions may still be used to compile activity data, and optionally provided for downstream use via a hashing protocol, thereby avoiding direct disclosure of the anonymous MAC address to the consumer. These and other such privacy settings will be readily apparent to the person of ordinary skill in the art and are likely to vary from area to area based on evolving local privacy regulations and the like.

As introduced above, other techniques may also be used, in conjunction with basic device detection and recognition, to supplement device tracking and further develop the knowledge base. For example, while device identification and recognition may be implemented via packet capture of probe requests, as noted above, other packet captures and/or logging/tracking techniques may also or alternatively be used in conjunction therewith to automatically access a greater representation of user activity. For example, multiple data exchanges may be tracked between the device and a hotspot access point while negotiating and ultimately accessing the hotspot network. Similarly, one or more radios may be used at the hotspot location to identify and track visiting devices. For example, multiple radios may be used at a same location to promote greater proximity data acquisition (e.g. multiple RTLS radios) and thus increase accuracy of the downstream analytics relying on such data.

FIG. 2 schematically illustrates hotspot engagement levels for characterizing a device visit at or near a given hotspot location. Namely, passive visitors 202 may carry devices that are, at the highest level, merely detected as being present within the vicinity of the hotspot. In one example, passive device detection may occur at a first level via a probe request packet capture or an RTLS detection, as discussed above, thereby directly identifying the device at or near the hotspot.

In a similar fashion, device communications may be intercepted via a third party receiver (e.g. a receiver in the area of the hotspot in question but not necessarily associated with the hotspot itself, that is, potentially operated by un unrelated entity and/or not readily accessible by the common knowledge base). For instance, a particular device may be out of range for a particular hotspot receiver to detect it, but may still communicate with another unrelated Wi-Fi transceiver, which unrelated transceiver is itself within range of the particular hotspot receiver. This example is shown schematically in FIG. 1, wherein unrelated hotspot 107, in range of one of the system's hotspots 106, exchanges data with a wireless device 103 that is not within range of this system's hotspot 106, for example, in processing a request for network access, exchanging authentication information, or managing an active network connection with the device 103. Accordingly, while transmissions emanating from the device in question 103 may not be captured by the particular hotspot receiver 106 of interest, communications emanating from the unrelated transceiver 107 and intended for the device in question may themselves be captured by the hotspot receiver 106 and thus identify the presence of the device 103 within the area of the hotspot 106. Clearly, such communications would again reflect the presence of a passive visitor, but such information may nonetheless be of interest in compiling visitor analytics in respect of the hotspot location of interest 106. Furthermore, since communications emanating from the unrelated transceiver 107 will necessarily include reference to a specific transceiver identifier (i.e. an access point MAC distinct from the access point MAC of the hotspot location 106 of interest), the system may be configured to automatically distinguish local (direct) from foreign (indirect) visitors, and, possibly, to perform comprehensive analytics as to the number of visitors associated with nearby locations as compared to those present at their own location (i.e. competitor intelligence could be compiled). In any event, the device may still be recognized from a previous visit at the same or another hotspot location populated in the device's stored device profile, or identified as a new device and recorded in the creation of a new device profile.

Again with reference to FIG. 1, in one illustrative embodiment, the system 100 may further or alternatively comprise or be configured to interface with a set of Wi-Fi radio locations 109 operatively disposed in different locations to, much as in the context of the hotspots 106, allow the system 100 to identify and recognize remote devices 102 when in their general vicinity. For example, such radios 109, while not operated to provide devices with wireless access to a network connection, may nonetheless operate to capture local transmissions sent by these devices and extract therefrom a unique device identifier (e.g. MAC address via packet capture or RTLS) to be cross-referenced with the knowledge base and, where a match is made, allow recognition of the device as being present at the given location, and otherwise allow for the creation of a new device profile. Again, given the passive nature of the intercepted wireless transmissions, such device visits would be characterized as passive visits. Regardless, valuable market data may still be compiled with respect to the devices identified at each location, as can device visit profiles be created and stored, as will be described in greater detail below. Much like device identification and recognition at an active hotspot, devices recognized at a given location that have opted-in for or authorized (directly or indirectly) the system to communicate directly therewith upon detection, may be targeted upon satisfying certain criteria, such as upon qualifying as a repeat or loyal visitor, a new visitor at a particular location, meeting certain target demographics, etc.

Active visitors 204, on the other hand, may be progressively characterized as hotspot associated, whereby the device's radio has identified the hotspot access point and is attempting to connect; hotspot active/intercepted, in which the device is actively connected to the network but not yet authenticated for access to the Internet, for example (e.g. may yet to enter authentication credentials, temporary password, network access key, or the like); and/or hotspot authenticated, whereby a device has been authenticated for network access at the hotspot. Further engagement may also be provided, as will be described in greater detail below, by way of a user opting-in for services, promotions, applications and/or packages, for example, or merely by accepting terms and conditions laid out in exchange for free open access to the hotspot network connection, for example. Such opt-in or service access conditions may include express authorization by the user for designated system access privileges to the device and/or to user data stored thereon, or include the volunteering of user data by way of user action on the device for system storage and use. As each level of interaction provides an increasing or at least continuing ability to extract information from the device and/or to characterize the device's activity via recognizable network communications, further information can be gathered in respect of the device's user by tracking not only device identification and recognition, but also an engagement level and visit duration. Conversely, it will be appreciated that fewer and fewer visitors will be identified with increasing levels of engagement. Based on the acquired data, it may be that a given hotspot operator may attempt to increase engagement by visitors, for example by way of "network access" or "opt-in" incentives, so to increase its access to device and/or user data and thus enhance device profile analytics and applications. Irrespective, each engagement level provides the system access to recognizable device transmissions, which, in one embodiment, may include an access point MAC address (e.g. for cross-referencing hotspot location) and a device MAC address (e.g. for device recognition), and further include for association and authentication level events, an event start/stop value. Each event may also have associated with it a date/time stamp, for example. Where an RTLS module, for example, is also or alternatively used, a signal strength of the device may also be captured, thereby allowing for further characterization of the visit, namely, as a function of user proximity to the hotspot location (e.g. internal or external to the establishment providing network access), which proximity may also be logged as a component of the device visit.

In one example, and as will be further exemplified below, the system may be configured to wirelessly transmit an engagement offer to the device that requires user action on the device for implementation and that ultimately results in the system gaining enhanced communicative access to the device. Upon subsequently detecting and recognizing the device, the system may be configured to use this enhanced communicative access to automatically engage a user of the device (e.g. without user input). For example, in one embodiment, the requested user action results in the transmission of user contact information to be associated with the device profile in the knowledge base (e.g. automatically extracted from the device or directly or indirectly input by the user). Upon subsequent detection and recognition of the device at the hotspot or a related hotspot (or again at one or more passive system sensor locations, such as sensors 109 of FIG. 1), the contact information can be accessed from the knowledge base and used to communicate a message to the device.

Similarly, the requested user action may rather or also result in the download of an application (e.g. app) associated with the hotspot location, or a designated group of hotspot locations, to be operated on the device. In doing so, a unique application identifier may be stored in relation to the device's profile and used to communicate directly with the downloaded application operating on the device when the device is subsequently identified and recognized at one of these hotspots (or related sensor locations).

In one example, a particular device visit is compiled as a series of events over time captured and logged by the system, from initial detection in one example by way of MAC address packet capture upon the device scanning for available network connections, followed by network association, interception and/or authentication upon the user gaining access to the hotspot network (which may last anywhere between a few minutes to a few hours), to termination upon the user breaking the connection, upon the system logging a final packet capture event, or again upon the user turning off the device (e.g. a laptop may be shut down before leaving the location, whereby a finalizing packet capture is not available to mark the device leaving the location, as may otherwise be available from a smartphone device or the like that remains activated as the device leaves the location). The network disconnection event, much like a final packet capture event, may therefore act as a visit closing point as the last detected action of the device at the hotspot. In this scenario, a comprehensive visit profile can be compiled from a combination of passive and active detection mechanisms to enrich the data collected as it pertains to a particular visit.

FIGS. 2B to 2D provide examples of visit profiles for a given location that may be compiled using the above considerations, which profiles may then be used to gain market intelligence on the location's clientele, to gear marketing and/or promotional efforts, to allocate resources and/or project product or service demands, and/or to target selected clients or client groups, for example. An optional visit proximity profile is overlaid on the visit timeline profile, for example rendered via proximity data extracted from an RTLS data stream, in further characterizing a device visit. Clearly, a visit proximity profile may be used independently to produce usable results, as will be further illustrated by the below-described examples. Further, while packet capture detection is considered in the below examples for device detection, an RTLS data stream may otherwise be used to provide similar effects, the added option of further capturing signal strength data to further characterize device proximity.

In the example of FIG. 2B, a uniquely identifiable device is first detected (D1) by way of packet capture (or RTLS). The device is then associated (AS) with the hotspot and later authenticated (AU START) for wireless network access. Packet capture again identifies the device (D2) before the authenticated session is closed (AU END). As no further detection events take place after network disconnection, the visit is characterized by the time lapse from first detection to authenticated access termination. Based on the duration of the visit (e.g. upon the visit duration exceeding a preset threshold), and the level of engagement recorded (e.g. authenticated access generally associated with an engaged patron), the visit is classified as an active walk-in, and thus as a likely profitable patron that may be likely to return given his lasting use of available network resources. Note that proximity data may be used in conjunction with the engagement timeline to further characterize the visit. For instance, in this example, signal strength data (schematically illustrated as a time-varying curve or smooth-linked discrete data points alongside visit profile event timestamps) is processed to indicate proximity of the device as exceeding a preset proximity threshold 250, thereby indicating a high likelihood that the device is in fact located within the hotspot operator's premises or establishment, thus confirming the visit's status as an active walk-in (e.g., as opposed to a device actively used from the parking lot outside the hotspot operator's premises, that is beyond a physical boundary at least partially defining the hotspot operator's location). Should proximity data indicate otherwise, the system could question whether the detected device is in fact making use of hotspot services without necessarily supporting the hotspot operator, and take appropriate action or log the visit accordingly. In any event, and as noted above, upon cross-referencing the device's unique identifier (e.g. the MAC address extracted upon initial detection, possibly enriched by recognizable attributes associated therewith in the device profile and associated with network access authentication) with a database of known device profiles, the visitor may further be characterized as a returning customer (e.g. if previously identified at this location or at one of several associated locations), or as a potentially new customer (e.g. if never before detected at this or related locations, but potentially previously identified and logged at an unrelated location). In any event, the visit may be recorded in the stored profile, or in a newly created device profile in the context of a new visitor heretofore never detected by the system, for recognition upon subsequent detection at this or another location.

In FIG. 2C, on the other hand, a device is briefly detected (e.g. via packet capture or RTLS—D1), thus defining a visit more likely associated with a walk-by, namely an individual that did not necessarily patron the hotspot location. Tracking these visitors may, as will be described in greater detail below, provide information useful in drawing in such walk-by visitors, thus effectively seeking to convert them to walk-ins. In the context of this example, and where RTLS is used, proximity data may again be used in combination with event timing/visit duration data to further characterize user activity. For example, a short duration visit may be characterized as a walk-by where no further data is available, but may otherwise be characterized as a short walk-in where proximity data indicates that the device did in fact enter the premises of the hotspot operator (e.g. where proximity exceeds a preset threshold 252). Using a coffee shop as an example, a patron could come in and out of the coffee shop within a few minutes, but nonetheless warrant characterization of the visit as a walk-in. Accordingly, engagement level, visit duration and proximity data may be combined, when available, to refine characterization of a device visit.

In FIG. 2D, a repeat visitor is identified for a same location (or different locations tracked as part of a same group). For instance, a first visit may include a simple passive walk-in visit (e.g. in the coffee shop example, a visitor may be stopping in to pick-up a coffee "to go" without intentionally engaging the hotspot network), wherein the device is multiply detected over time (D1, D2, D3) but never further engaged before a final detection takes place a few minutes later. Combining identification event data with proximity data, again illustratively shown in this example as a y-axis increasing with proximity to the hotspot (i.e. increasing signal strength) the system can better distinguish between a true passive walk-in event (e.g. where a proximity threshold 254 is met) and an event in which the device, while close enough to be detected by the system, may in fact have been located outside or "next door" to the premises in question, or again detected via third-party communications picked-up by the hotspot radio, thereby still potentially logging-in a visit of sufficient duration to qualify as a walk-in, but in fact representing a "close" walk-by. In any event, later that day, the same device may be detected (D4, D5, D6) and recognized, this time further engaging the system via authenticated network access and direct engagement (AS, I, AU START, E, AU END), characterizing the visit as an engaged repeat walk-in visit. Following from the above coffee shop example, engagement may be introduced via a product or promotional offering, whereby a user may elect to "opt-in" for a particular service via a network landing page or the like, thus exchanging further information with the system to enable or activate the opt-in service. For example, the user could select to download a free iTunes™ song in exchange for filling-in a customer loyalty form, providing their e-mail address for a chance to win a free gift or service, or again downloading a free location-specific or related app for implementation on their device, which app then readily accessible by the hotspot operator for subsequent interaction with the visitor.

In this last example, a visitor accessing a hotspot location at an airport may be offered a flight status app or the like to be implemented on their device, which app may later be accessible by the hotspot or related operator to promote airport shopping or services upon detecting and recognizing the device during a subsequent visit (e.g. send a scanable coupon via the app to promote a certain shop or restaurant). Other examples may include, but are not limited to, the exchange of SMS messages, device and/or user association with the hotspot operator via a social network or the like (e.g. Facebook™ "like" status, twitter account following, etc.), etc.

Upon such engagement, not only can the system track engagement of this particular device, further information relating to the user(s) of the device, or the device itself, may be extracted, either directly as input by the user, or indirectly upon the user accepting certain terms and conditions required in receiving the opt-in service (or again required upon requesting free network access privileges). As will be described in greater detail below, acquisition of such further information can be stored and associated with the device profile, and used downstream to enhance the user's experience and promote further patronage, for example. For instance, as noted above, a repeat 'opted-in' visitor may be automatically identified and recognized upon detection, and automatically prompted by the system. Following the above-example, an opted-in visitor having provided his e-mail address may receive an automated greeting from the system, which may include a promotional incentive for the visitor to further enhance patronage of the hotspot or related location. Other examples will be provided below in respect of the embodiment described with reference to FIG. 6.

Accordingly, the system 100, and its equivalents, may be configured to compile data in respect of each device visit to a particular hotspot, whereby visit data gathered and compiled in respect of each detected device, and optionally at different locations, may be combined to provide market intelligence as to the type of users frequenting a particular location and/or type of establishment, the amount of time spent at each location, the level of engagement with the system while at each location, and so on. Proximity data may also be used to characterize spatial movements of recognized device and further distinguish hotspot patrons from non-patron visitors. Further, through device recognition and visit profiling, evolution as to a particular device's engagement with a given hotspot location, or group of hotspots, may be tracked/monitored to evaluate the general effectiveness of measures implemented for drawing-in further patronage, for example. Data may be used specifically to evaluate engagement, and indirectly patronage by the user(s) of a particular device, or used in combination with data compiled for a select group of recognizable devices, or globally for all recognizable devices identified in respect of a particular hotspot location of group, thus drawing on averaged performance measures to systematically increasing patronage, engagement and/or exposure. Clearly, different visit profiles and characterizations may be considered within the present context without departing from the general scope and nature of the present disclosure, as can different analytics, reports, applications and features applied as a function of such profiles, as will be further described below.

In accordance with one embodiment, and as introduced above, proximity data, for example as acquired and processed via an RTLS data stream encompassing signal strength measurements, can be used alone on in combination to characterize a device visit profile. For example, a user's proximity to a given hotspot location, and in particular to a radio receiver operating at this hotspot, may be used to characterize the user's visit. Namely, as signal strength naturally drops as function of distance, a passerby's device will generally exhibit weaker signal strength than a patron's device located within the establishment operating the hotspot. Similarly, where a hotspot location is circumscribed by a physical boundary, such as walls, doors, dividers and/or windows in an enclosed or partially enclosed room or establishment, further signal strength degradation is generally expected through such boundaries, thus further manifesting itself within acquired signal strength data. Accordingly, upon compiling this data in respect of a given device, the system may, as for example depicted in FIGS. 2A to 2D, characterize a device visit as a function of a preset signal strength threshold or the like. This characterization, alone or in combination with other visit profile data such as visit duration data, may be used to characterize the visit.

As will be described in greater detail below, different approaches may be leveraged to increase the accuracy of information to be extracted or compiled from device visit profiles, and in some embodiments, multiple techniques may be used concurrently or in the alternative depending on various parameters defining a given establishment (e.g. type of location—open air vs. enclosed; configuration of location—square vs. L-shaped; building materials within and/or enclosing location—glass/windows vs. concrete; etc.), parameters defining a particular time period (e.g. multiple occurrences of structural or physical interferences during a given time of day, varying clientele type or behaviour for different periods in the day, etc.). Different examples will be provided below with reference to FIGS. 7 to 14, and in accordance with different embodiments, to illustrate different applicable situations and approaches to compiling and extracting usable results therefrom.

With reference to FIG. 3, and in accordance with one embodiment, a detailed diagram of the various processes implemented in not only identifying and optionally recognizing a device at a hotspot, but also in characterizing a device visit and, as appropriate, outputting a related notification or report to an interested party (e.g. hotspot operator) will now be described. In this example, a device 302 is again first identified at a hotspot or similar access point 306 via packet capture (PCAP), for example via a PCAP listener 312 as introduced above. It will be appreciated that while this embodiment considers the use of PCAP for device recognition, other means such as provided via an RTLS data stream may also or alternatively be used to provide similar effect, with the potential added benefit of leveraging signal strength data available via RTLS and its equivalents. The PCAP event may provide a first detection instance in a particular visit, but may also provide subsequent detection instances, for example at regular intervals as per the normal operation of the device, which may periodically probe its environment for available network connections. Other event sources, such as a syslog in the context of authenticated network access, interaction with an opt-in service or application implemented on the remote device, and the like, can also be used to enrich visit data, each such event generally handled by the M2M module 314 by respective event listeners/handlers 322. A visit creation and aggregation module 324 is operatively associated with the event handlers 322 to aggregate and store in knowledge base 326 a visit profile for each uniquely identified device. In this particular embodiment, each visit is queued by a visit queue 328 and processed by a data engine 330 configured to receive, qualify and act upon compiled visit profiles, e.g. to isolate, filter and/or consolidate visits satisfying designated rules for further processing, reporting and/or action. For example, a particular visit profile may be pulled from the queue 328 and processed through a rules engine 332. Upon the visit profile matching a particular rule set at step 334, the visit profile can be identified to an action engine 336 with a particular action to be performed identified by the matching rule set, for output to the downstream consumer 338 at step 340. An exemplary action may include an HTTP Push Notification to the consumer, or other such reporting functions as will be illustrated in greater detail below.

Different illustrative rules may include, but are not limited to, rules for characterizing a selected visit as a function of preset conditions, such as duration and/or proximity (e.g. walk-in vs. walk-by), level of engagement (e.g. passive vs. active), type of engagement (e.g. detected vs. authenticated vs. opt-in device), opt-in status, etc.; rules for identifying visitors (e.g. opted-in visitors, return visitors, new visitors, long duration visitors) to whom targeted content may be pushed and/or with whom direct interaction should be promoted; reporting rules based on one or more visit qualifiers set as being of particular interest to the downstream consumer; etc. As will be appreciated by the skilled artisan, and as introduced above, rules may be set as a function of preset thresholds (e.g. proximity threshold or range, duration threshold or range, visit frequency and/or range, etc.), whereby cross-referencing of real-time and/or device/visit profile data with such thresholds may allow for adequate characterization of the device, its user, and their visit at the hotspot or similar location.

Figure 4:
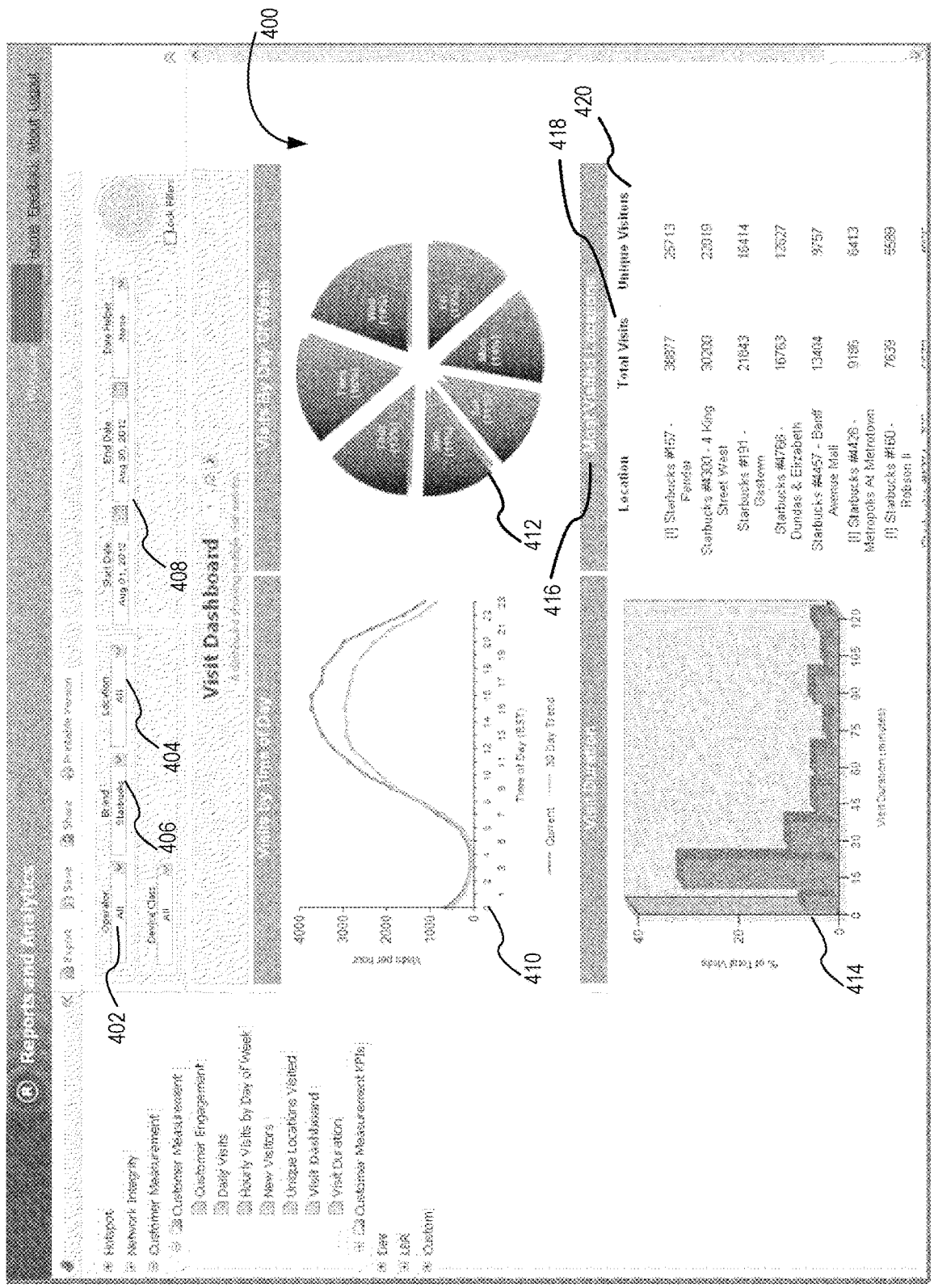
FIG. 4 is an exemplary screenshot of a system reports and analytics site consolidating visit and device-related data accessed over time in respect of a plurality of participating hotspots and/or hotspot operators.

With reference to FIG. 4, and in accordance with one embodiment, an illustrative data management interface 400 will now be described. In this example, a consolidated management interface can be provided to consolidate device identification and recognition data, report and analyse device activity and visit patterns, and so on. In this particular example, data is isolated for all operators 402 and locations 404 of a selected Brand 406, such as Starbucks™, for example, and that, for a selected date range 408. Accordingly, aggregated data will be consolidated to present average activity data for all participating locations of this particular Brand, in this particular example, formatted to represent a visit dashboard (e.g. a selected subset of "at-a-glance" visit analytics for the selected period).

In the selected view, a chart 410 is provided tracking visits per hour during the course of a day, and comparing average visits over the selected data range (30 day trend) to current data (real-time tracking), thus visually identifying a current above-average number of visits per hour across all locations. A pie chart 412 is also provided breaking down percentage total visits by day. A bar graph 414 shows a percentage distribution of visits as a function of visit duration, showing a significant fraction of visits lasting approximately 15 minutes. A breakdown of visits per most-visited locations 416 is also provided, distinguishing Total Visits 418 from Unique Visitors 420 (i.e. collapsing repeat visitors). Other features and applications are also made available in the illustrated interface, including options for consolidating data on: Visit duration analytics; Unique location visit analytics; New visitor analytics; Day by day hourly visit analytics; Daily visits analytics; and Customer engagement analytics, to name a few.

Figure 5A:
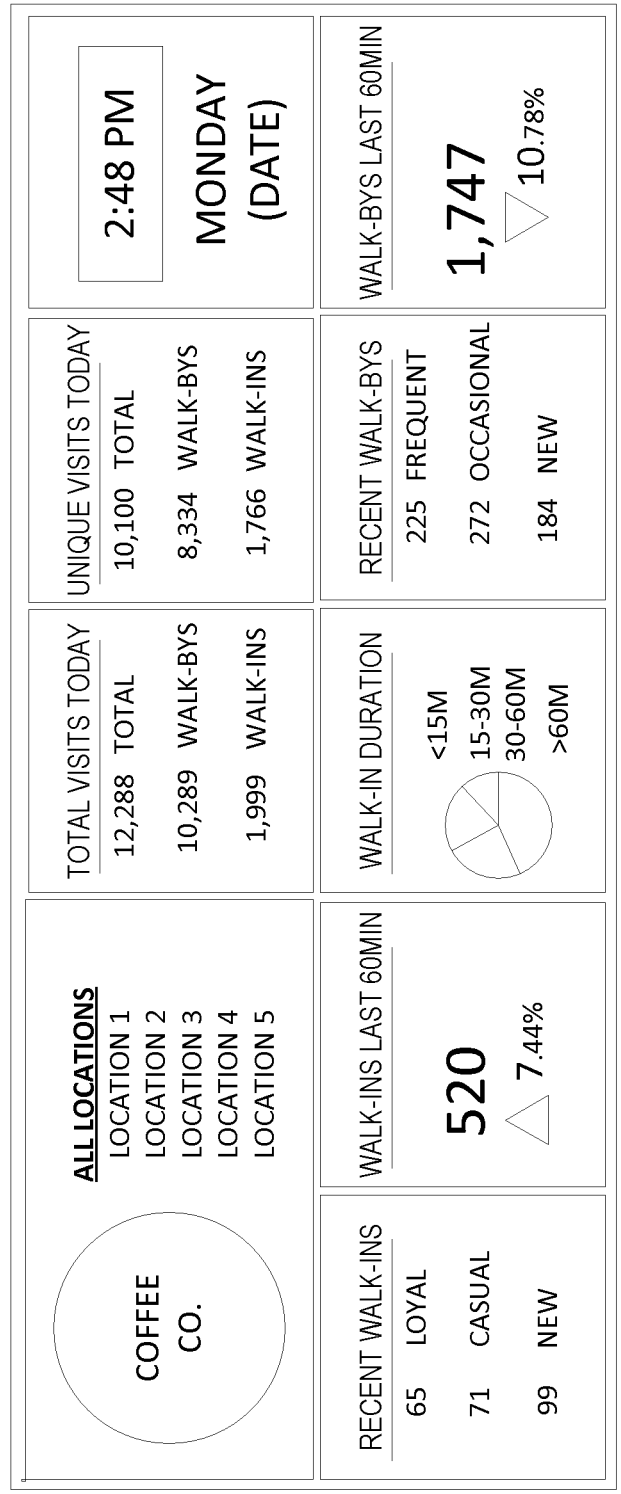
FIGS. 5A and 5B are exemplary graphical user interfaces providing a real-time dashboard of device and visit-related data in respect of multiple hotspots operated by a common hotspot operator, and in respect of a single hotspot, respectively, in accordance with one embodiment of the invention.
Figure 5B:

With reference to FIGS. 5A and 5B, regional and location-specific dashboards are respectively represented. In the regional dashboard of FIG. 5A, data is compiled and displayed in respect of 5 designated locations in a given area. Selected data windows include the total number of visits for the day further subdivided as walk-bys (visits lasting less than 5 minutes in one example, thus suggestive that the user of the device may not have actually entered the premises, or again optionally further characterized by a visit during which device identification events were combined with proximity data to confirm that the device never entered the premises.), and walk-ins (visits lasting more than 5 minutes). Another selected window includes the total number of unique visits for the day (i.e. taking into account those making multiple visits, which may include those walking by repeatedly and thus being detected and recognized as such), again subdivided into walk-ins and walk-bys. Another selected window classifies recent walk-ins (e.g. visits detected to last more than 5 minutes) as loyal, casual or new visitors (e.g. based on preset loyalty rules). For example, devices recognized to attend one of the regional locations at least twice a week may be categorized as a loyal visitor, as compared to one recognised to attend only twice a month and thus characterized as casual. Similarly, recent walk-bys may also be characterized as such. Respective windows are also provided in this example to show a number of walk-ins within the last hour and a comparative indicia identifying a percent change in this value as compared to the previous hour; a number of walk-bys within the last hour and a comparative indicia identifying a percent change in this value as compared to the previous hour; and a pie chart tracking walk-in visit durations for the day in progress.

In the location-specific dashboard of FIG. 5B, data is compiled and displayed in respect of a singular location. Selected data windows in this example are similar to those depicted in the embodiment of FIG. 5A, with data necessarily representative of visitor traffic and activity within a single location.

Using substantially real-time data, as illustrated in FIGS. 5A and 5B, and at a higher level in FIG. 4, a hotspot operator may proceed to make educated decisions as to how to market or promote their services, namely in seeking to attract further clientele (e.g. investigate options for drawing in walk-bys, and particularly repeat walk-bys that may, for instance, be predicted to frequent a competing establishment in the area), and/or to better service existing clientele and encourage further engagement. Using real-time and/or regular data updates a local or regional operator may track immediate results to different marketing or promotional campaigns aimed at improving patronage. For example, a local coffee house hotspot operator may observe that walk-ins drop significantly during certain periods of the day or again on certain days, and investigate potential reasons therefore, which may lead to creative solutions to draw in greater patronage at those times or on those days. Similarly, peak walk-by periods may suggest the use of a more aggressive sidewalk promotion strategy around those periods to draw these visitors in. Other considerations may rely on acquired device profile data to plan for services and demand on given days, or during certain periods of the day. For example, while sales receipts may allow tracking of variable demand patterns, visit duration data may allow for greater insight as to physical space allowances, visitor comfort (i.e. would increasing visitor comfort or improving visitor environment help prolong visit durations and boost sales, or hinder flow through of new walk-ins.).

Similarly, given the potential real-time nature of the acquired data, immediate reporting or push notifications may be dispatched to the location in question to incite immediate action. For example, where walk-in rates show a significant drop over the course of the last hour, a location manager may immediately evaluate conditions that may have led to such decrease (e.g. overcrowded space or limited seating, shortage on certain menu items for a coffee shop or restaurant, loud or unpopular background music, disturbingly loud group of patrons, etc.). Access to such immediate observations on patronage and engagement may thus lead to faster identification and remediation of perceived issues, or again to noting particular characteristics or settings seemingly conducive to an increase in patronage (e.g. live music, effective sidewalk advertising, personal greeter at the door, etc.).

Similarly, the immediate identification and recognition of repeat patrons may trigger a more receptive or dedicated service, as can recognition of "opt-in" devices at a given location be used to push instant notifications to those devices or again to service providers/sales representatives at the location to encourage provision of enhanced services, communicate a "usual" order to the cashier before an order is actually made, or simply allow for a personal greeting to a "regular" who may otherwise expect to be personally recognized by location.

Accordingly, the compilation of such data may allow for direct or indirect reporting of business intelligence metrics and/or analytics which may be utilised to adjust or refine business practices and/or offerings and to observe immediate, short and/or long term effects of such refinements on the business's clientele and performance. As noted above, reports may be rendered "at-a-glance" in the form of comprehensive and/or customizable dashboards, as instant notifications, or alternatively rendered as detailed business intelligence reports for detailed analysis.

Reporting can also take different forms depending on the intended analysis to be performed and intended outcome and application of such analyses. For example, data may be compiled to provide location segmentation reporting, such as to determine and illustrate a mix of devices recognized at a given location or group of locations (e.g. number of loyal/regular/occasional/new customers at a given time or during a given period). Data may also or alternatively be compiled to provide device segmentation reporting, such as to qualify the visit patterns of a particular device (e.g. Loyal/Regular/Occasional/etc.). Where a device has been opted-in to a particular service offering in exchange for the rights to disseminate, exchange and/or use the device's user's personal data (e.g. demographics) and/or communication streams (e.g. e-mail, SMS, social network, etc.), reports may also, or alternatively include specifics extracted from the device and/or user indicative of the user's gender, age, past purchase history, visit profiles, social status, etc. On the latter, further details and examples as to the various manners by which social data may be extracted, combined and bound with a user's device profile can be found in Applicant's co-pending United States Patent Application No. 2012/0192258, the contents of which are hereby incorporated herein by reference in their entirety. It will be appreciated that other types of reports may be considered herein, as can different permutations and combinations thereof, without departing from the general scope and nature of the present disclosure. The above also provides a few illustrative examples as to different applications to device identification, recognition, and tracking. Other such applications are clearly intended to fall within the general scope and nature of the present disclosure, as will be further detailed below.

Figure 6:
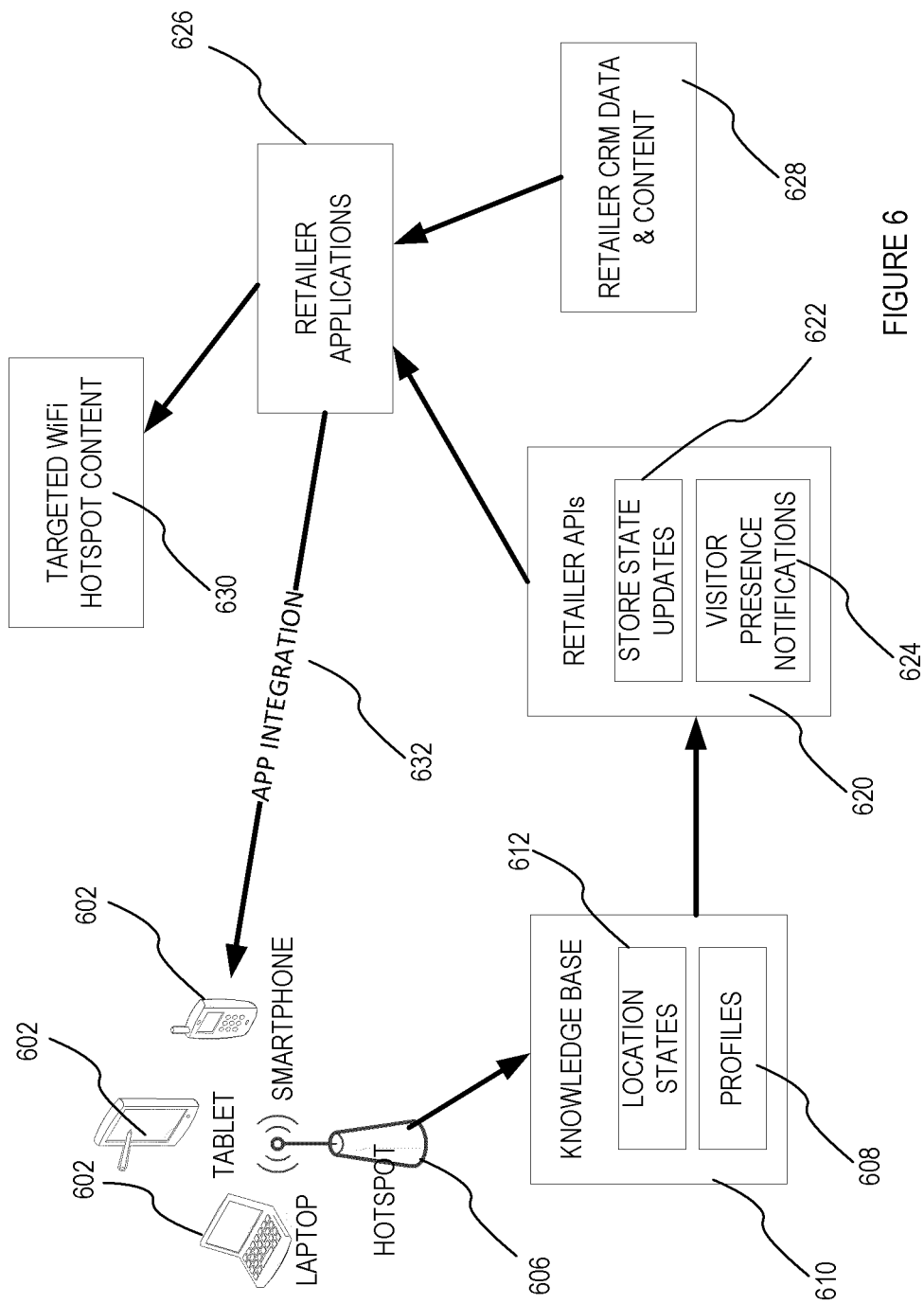
FIG. 6 is a diagrammatic representation of illustrative downstream applications for a device detection and recognition system, in accordance with one embodiment of the invention.

With reference now to FIG. 6, and in accordance with some embodiments, illustrative downstream applications for a device detection and recognition system will now be described. In this example, wireless devices 602 at a given hotspot or similar location 606 may be detected and respective device profiles 608 created and/or populated in knowledge base 610 to track and report on device activity at this location. A respective location state 612 is generally associated with each device profile instance, along with a timestamp or the like, as noted above, to ultimately characterize device presence/activity, location and timelines (e.g. visits) for further processing. In this embodiment, knowledge base data is made accessible to a consumer through a retailer API 620, or the like, so to update store (location) states 622 and provide visitor presence notifications 624, for example. For instance, store state updates 622 may include, but are not limited to, the push or pull of global, regional and/or local visitor dashboard updates, or the like, so to allow for the substantially real-time processing of visitor activity data in extracting immediate or near immediate market intelligence. In some embodiments, immediate action may be initiated as a function of store updates, such as the application of instantaneous promotions, service upgrades, or again, in increasing network access coverage and/or capacity where visitor updates are indicative of an increased demand for network access, for example. Long term projections and analytics may also or alternatively be compiled based on updated data compiled over time.

In this example, the retailer API 620 communicates with one or more retailer applications 626, which may also access retailer CRM data and content 628 to supplement interactions with visitors at the hotspot location(s). For example, retailer applications 626 may be configured to provide targeted Wi-Fi hotspot content 630 to visitors, namely visitors actively engaged via network authentication or opt-in visitors readily accessible, for example, by way of contact data or information volunteered by the visitor during the opt-in process (e.g. social network interface/account-related content, web content or pop-up advertising, foreground inset content, background content, etc.). Additionally, or alternatively, targeted content may be pushed via retailer app integration 632 on the visiting device, for example once downloaded upon opting-in for related services. Other examples of pushed or targeted content may include the sending of an e-mail or SMS message, for example, where such contact information has been volunteered or extracted and used under approval by the user of the device, again, possibly in the context of network engagement at a given hotspot.

For example, a device may opt-in to receive promotional information form an airline and its affiliates upon using the airline's network access services in their first class waiting lounge. Following from this example, the airline may be affiliated with a hotel chain such that, upon the user's device being detected at the airport lounge prior to leaving for a flight, the device owner's flight information may be retrieved by cross-referencing the user's e-mail as provided during the opt-in process for receiving promotional information, with an e-mail contact field associated with the user's flight ticket. Accordingly, the user's destination for that day may also be identified, allowing for targeted content associated with this destination (e.g. hotel chain location at the user's destination) to be pushed to the user. In a similar manner, upon the user's device being detected and recognized in the lobby at a given hotel chain location associated with the opt-in airline, a targeted message could be sent to the device welcoming the user and offering one or more promotional incentives, such as a room upgrade, complimentary breakfast, or the like.

As will be appreciated by the skilled artisan, from implementation of device location and recognition at different hotspot or similar locations within a given network as described above, and further by optionally tracking device engagement levels, visit profiles, and opt-in statuses and the like, myriad applications may be implemented to leverage the information gathered, tracked and compiled in real-time and/or over time to enhance network user experience, customer targeting, promotional efforts, operational projections, cross-partnership or affiliation advertising, to name a few.

Figure 7:
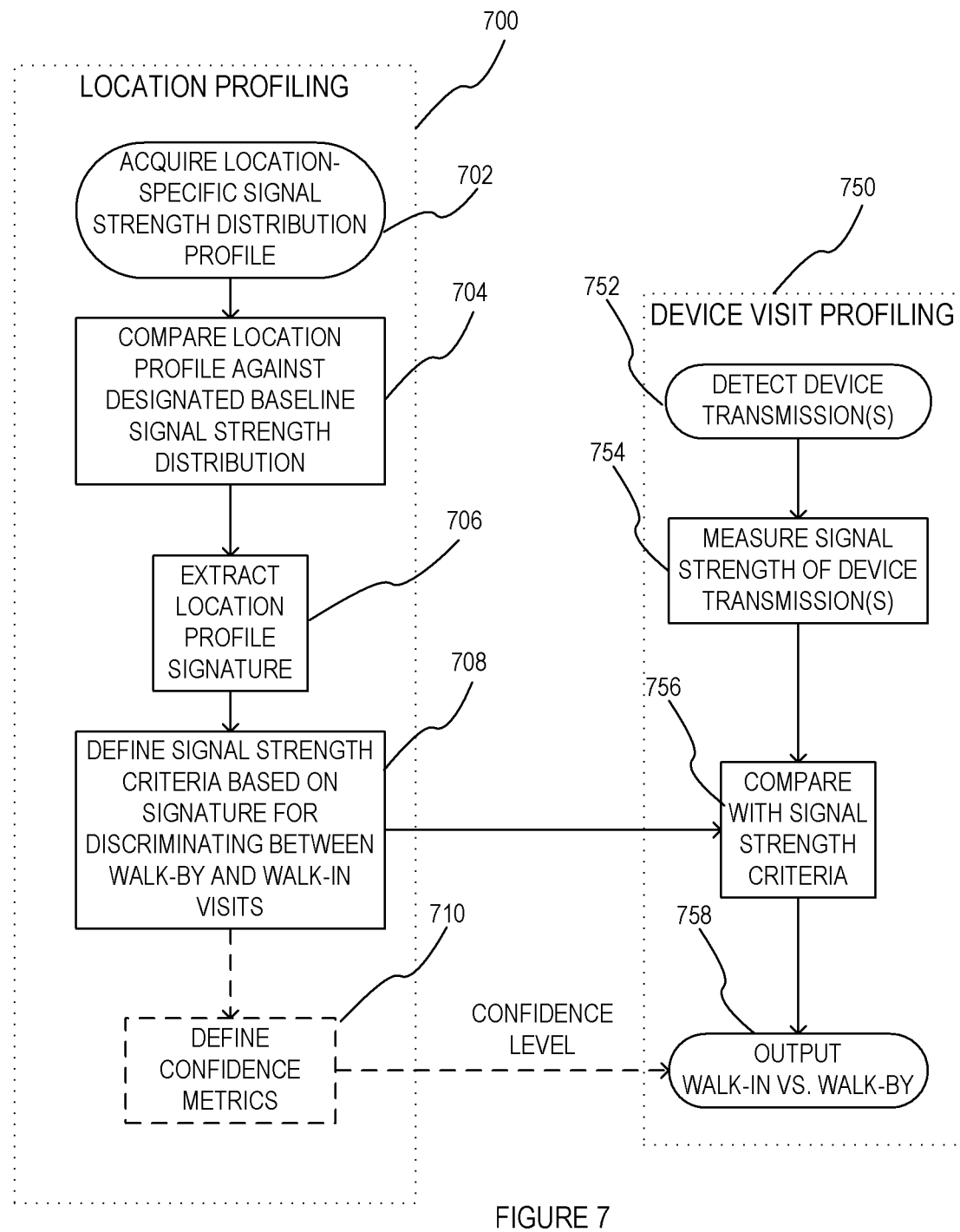
FIGS. 7 and 8 are flow charts of respective processes for automatically characterizing a device visit at a given hotspot location as one of a "walk-in" visit and a "walk-by" visit, in accordance with different embodiments of the invention.

With reference now to FIG. 7, and in accordance with one embodiment, a method for automatically characterizing a device visit at a given hotspot location will now be described. In this particular example, created device visit profiles are generally focused on the identification of devices carried by "walk-in" visitors, as compared to those carried by "walk-by" visitors. This categorization was introduced above with reference to FIG. 2, in which a device visit duration value or measured device signal strength exceeding a respective preset threshold was used to distinguish those visitors deemed most likely to represent active, engaged or otherwise reasonably identifiable patrons of the hotspot location, as compared to those most like passing by and thus less reasonably identifiable as a hotspot location patrons. It will be understood by the skilled artisan that the terms "walk-in" and "walk-by" are to be interpreted broadly to encompass different hotspot location configurations that may extend beyond the most straightforward configuration in which a device user either enters an establishment operating as the hotspot location, and in some instances remains within the physical boundaries defining this establishment for an observable amount of time (e.g. an enclosed room or space; an exterior or interior patio, terrace, or seating area; etc.), or passes by, for instance, on a sidewalk or street, in a hallway or common pedestrian area, or other such areas outside the establishment boundaries. Irrespective of the type and configuration of the hotspot location in question, the method described below with reference to FIG. 7 seeks to automatically characterize those users reasonably identifiable as customers or patrons of the hotspot location, as compared to potential patrons or customers, those identifiable if not recognizable as physically within the area of the hotspot location without effectively qualifying as an active customer of the location.

In the example of FIG. 7, the hotspot location is first characterized via a location profiling process 700 in which one or more signal strength criteria can ultimately be defined to later characterize a visiting device as a walk-in vs. a walk-by device based on, in this example, signal strength alone. For instance, location profiling may be used to set a signal strength threshold, as introduced above with reference to FIG. 2, against which subsequent visitors may be compared. In profiling the location, a location-specific signal strength distribution profile is first acquired, for instance over a statistically significant time period so to define a reliably reproducible distribution representative of the hotspot location. FIG. 9A provides an example of a signal strength distribution 900 acquired for a given location from a single radio and plotted as a probability distribution. In this particular example, a bimodal distribution is clearly observed, whereby a high signal strength mode (i.e. first identifiable mode from the left on FIG. 9A) most likely represents devices within the physical boundaries of the hotspot location establishment, whereas a low signal strength mode (i.e. second identifiable mode from the left of FIG. 9A) most likely represents devices outside these boundaries. Using this example, and in a simplest form of this method, a signal strength threshold could be extracted from this distribution, namely at some point between the observed modes, and different distribution analysis techniques may be implemented to achieve this extraction automatically (e.g. distribution peak or minimum finding techniques, etc.).

The specific shape and complexity of the distribution will however, vary significantly from location to location, as exemplified by the plotted probability distributions for different locations provided at FIGS. 9-14(A), for example where the bimodality of the acquired distribution is not so readily observable without further manipulation. Therefore, in order to increase the versatility of the proposed method, the location-specific distribution profile acquired at step 702 is compared at step 704 with a designated baseline signal strength distribution to extract a location profile signature at step 706. In the examples of FIGS. 9 to 14, the baseline distribution was approximated from a known open-air hotspot location, that is, from a known hotspot location operating in a generally open environment devoid of significant physical boundaries. This free-space distribution was then used as a baseline to facilitate extraction of a location signature, that is extraction of a refined signal strength distribution characteristic of the location and from which greater accuracy may be achieved. As will be appreciated by the skilled artisan, use of a free-space baseline may allow greater visibility of location-specific considerations embedded within the location profile, for example characteristic manifestations of the location's structural boundaries, interferences and the like.

An example of a free-space or "expected" distribution 910 is provided in dotted lines at FIG. 9B, from which a resultant signature or distribution deviation 920 may be comparatively defined (FIG. 9C). In this particular example, while a signal strength bimodality was more or less observable from the initial distribution (FIG. 9A), this bimodality is significantly highlighted upon comparison with the baseline distribution.

From the extracted location signature, distinguishing criteria may be more readily and accurately defined at step 708. For example, in FIG. 9D, and as will be described in greater detail below, the extracted signature 920 of FIG. 9C is fitted by a normal distribution curve 930, the apex 940 of which generally attributed to an average signal strength measured from devices physically located within physical hotspot location boundaries. Using this value, and possibly other parameters of the fitted distribution (e.g. standard deviation, etc.), one or more reasonably accurate signal strength criteria (e.g. signal strength threshold, range, etc.) may be defined at step 708 to characterize signal strength measurements acquired from future visiting devices.

An optional signature discriminating power may also be defined at step 710 to further characterize subsequent visitors, for instance in providing a confidence level or metric for qualifying the accuracy of such characterizations. For example, while the method of FIG. 7 may allow for greater accuracy and/or versatility, some locations may not be as readily amenable to this technique and thus, have associated therewith a lower signature discriminating power (e.g. automatically assignable by a relative spread of the extracted walk-in signal strength mode, a relative applicability/fit of the designated model, etc.). Similarly, confidence intervals or parameters may be defined in association with the defined criteria to qualify subsequent measurements, i.e. produce metrics for quantifying a likelihood of accuracy. These metrics may also or alternatively be used in downstream processes, for example as described below with reference to FIG. 8.

Upon completion of location profiling 700, device visit profiling 750 may be applied to characterize devices at or near the hotspot location as walk-ins or walk-bys. In this example, one or more device transmissions are first detected at step 752 (and optionally recognized from previous detections), and a signal strength thereof measured at step 754. The measured signal strength is then compared with the designated signal strength criteria (e.g. threshold, range, etc.) at step 756, and ultimately classified as representative of one of a walk-in or a walk-by visitor at step 758. Where a discriminating power has been optionally defined for the location signature, the output 758 may be further qualified or characterized as a function thereof.

Figure 8:
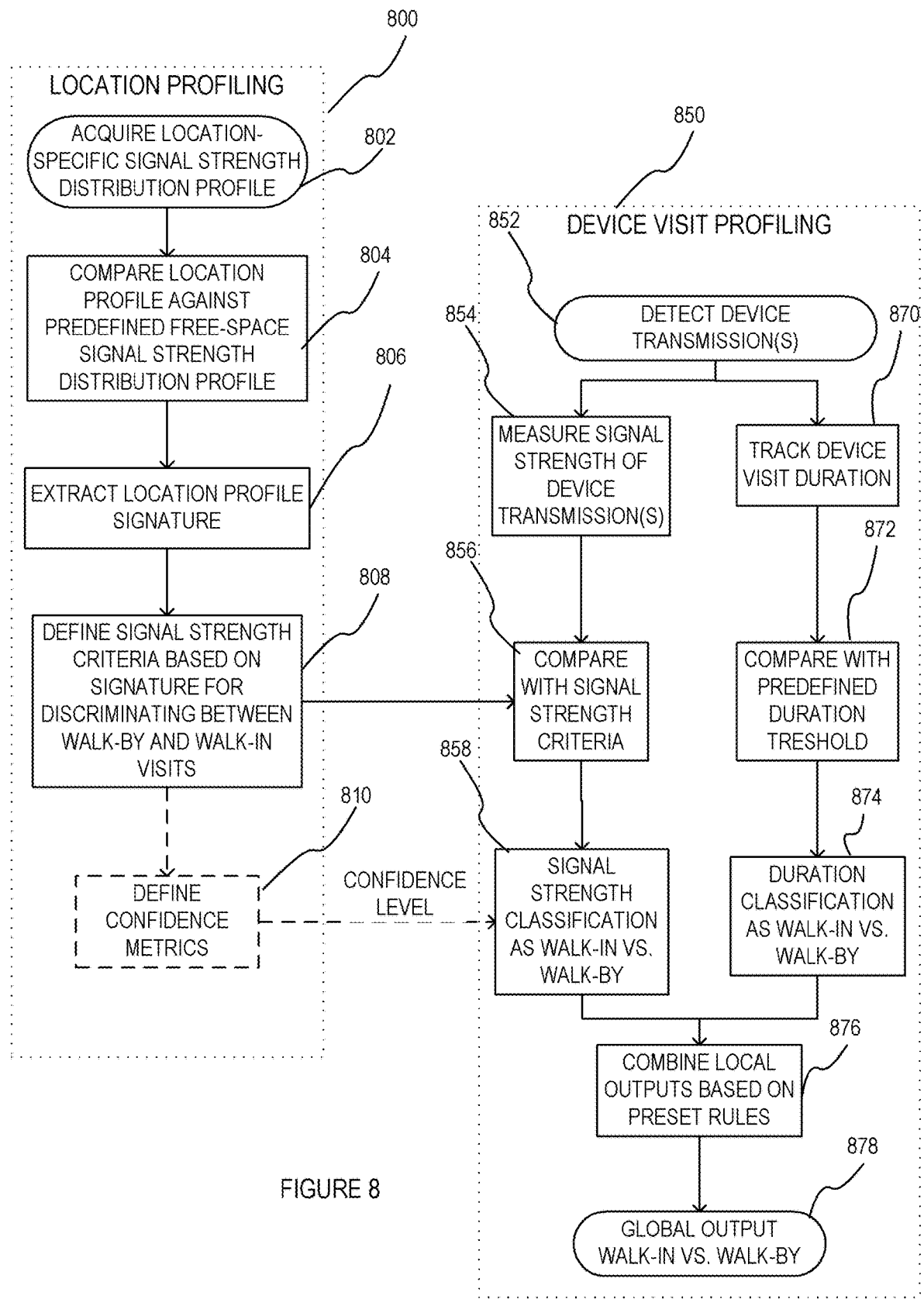
Figure 9:
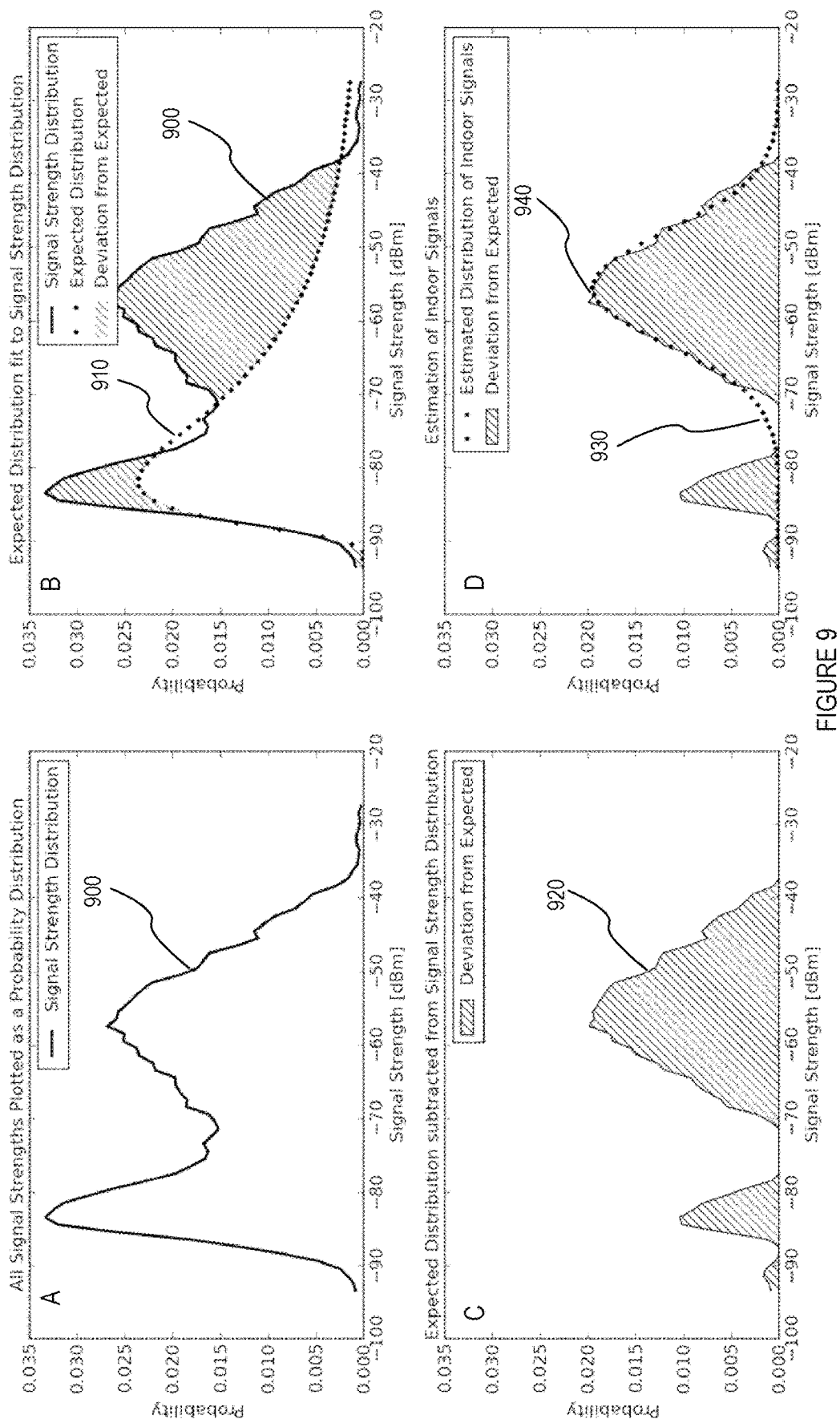
FIGS. 9 to 14 are charts of processed signal strength data acquired from different hotspot location receivers, respectively, in which each chart A represents a signal strength probability distribution acquired over time at a given hotspot location, each chart B represents fitting of a baseline distribution to the signal strength distribution, each chart C represents a deviation observed between the signal strength distribution and the baseline distribution, and each chart D represents fitting of an estimated indoor signal distribution to the observed deviation.
Figure 10:
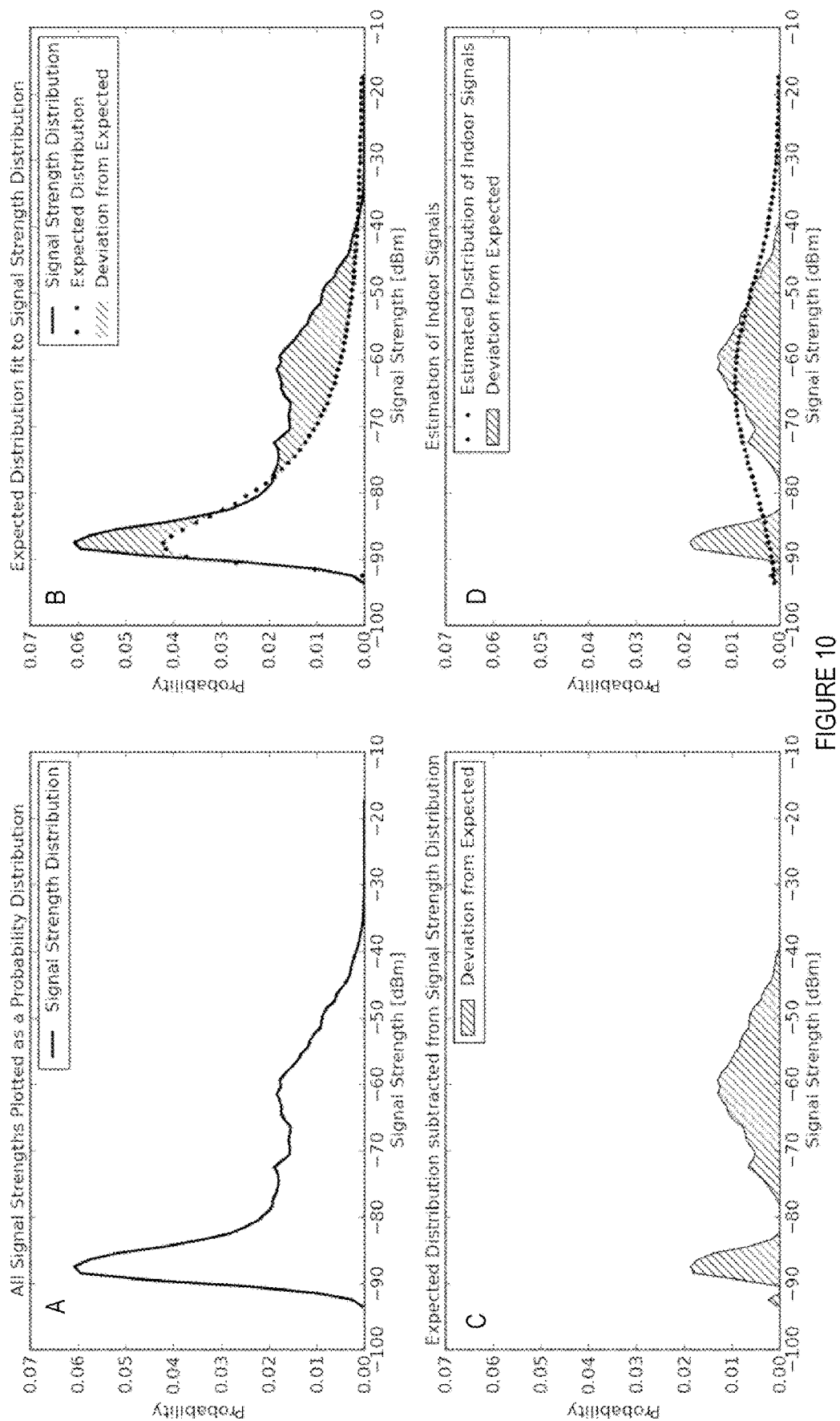
Figure 11:
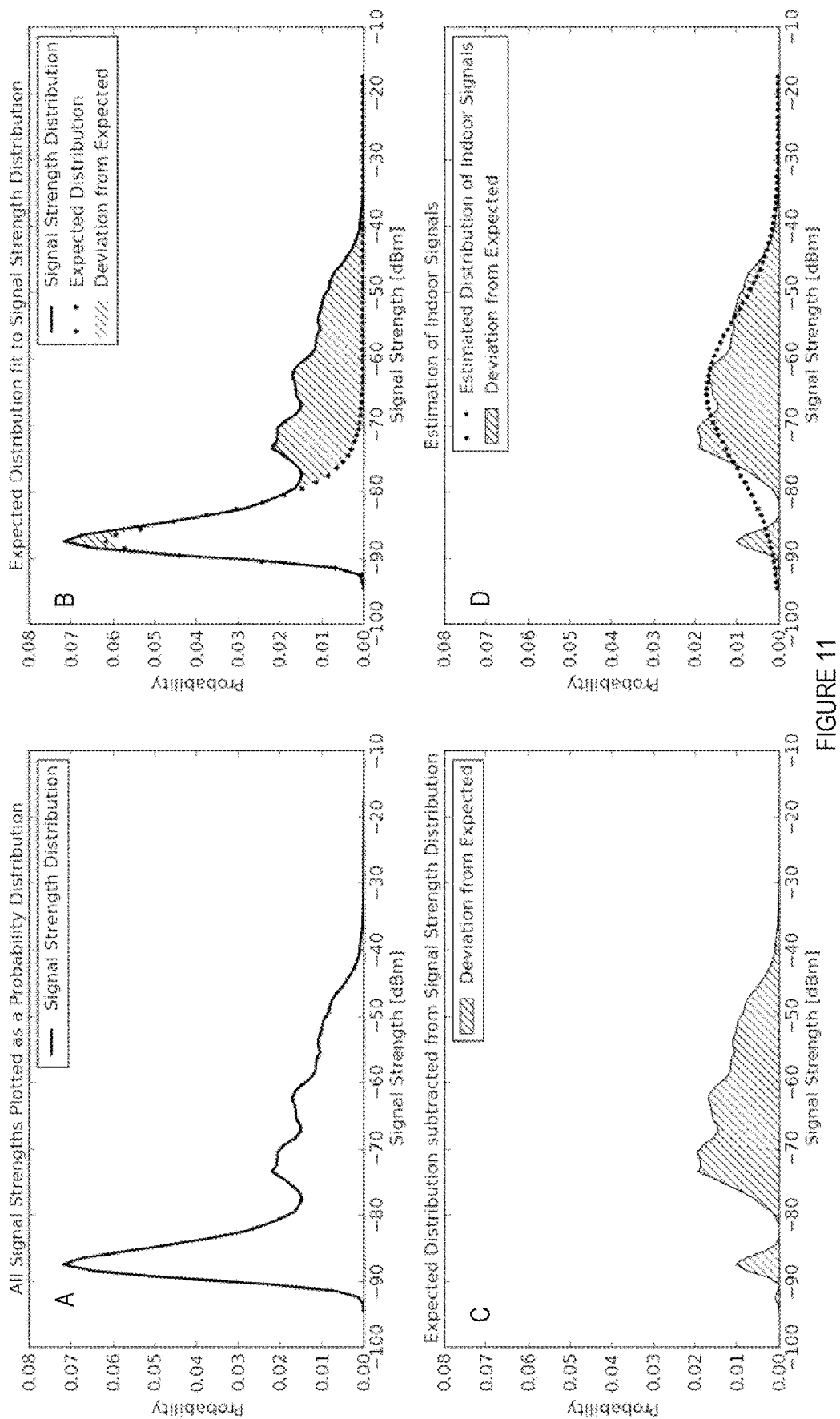
Figure 12:
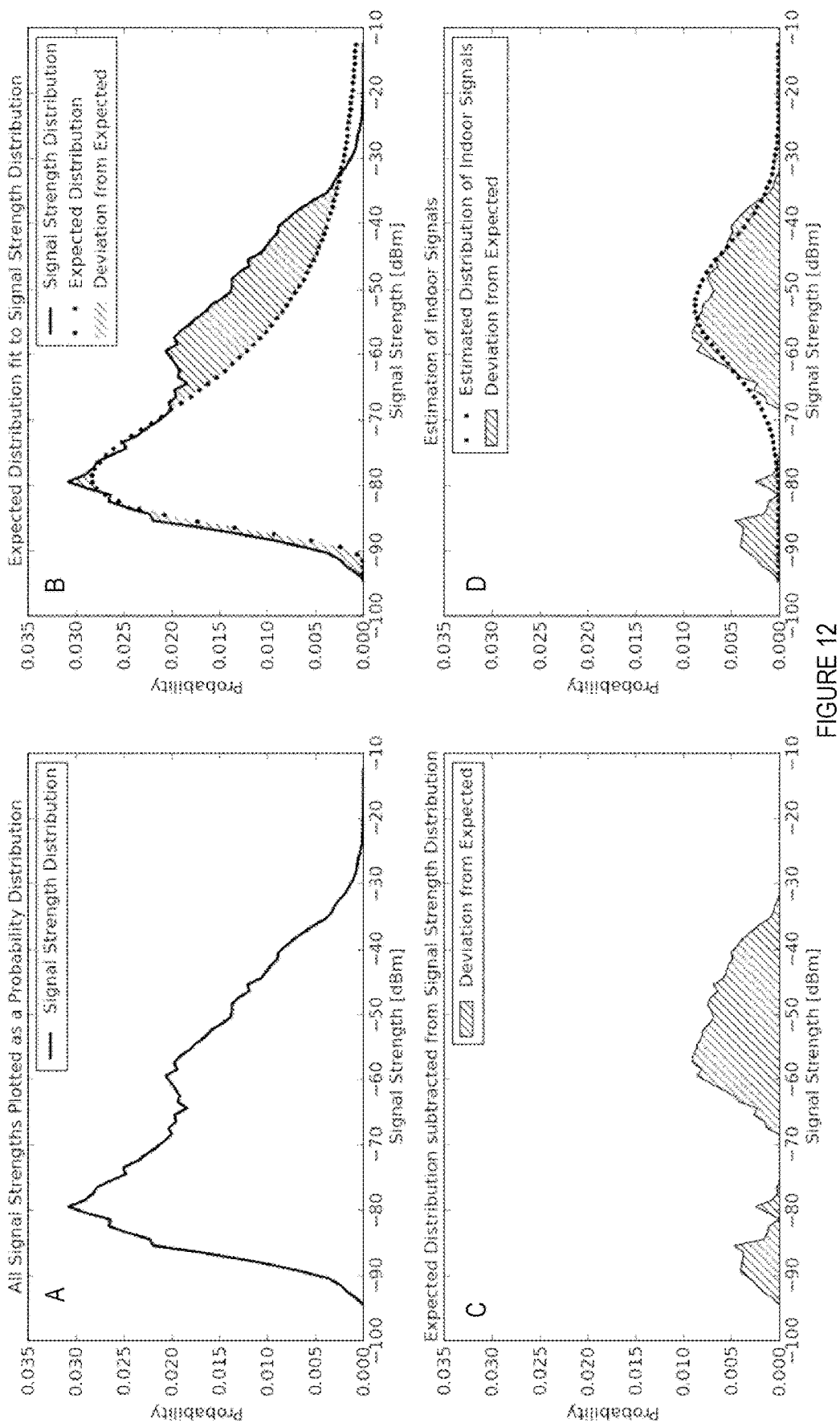

With reference to FIG. 8, and in accordance with another embodiment, location profiling 800 is again implemented in defining signal strength criteria for the downstream characterisation of visiting devices as walk-ins vs. walk-bys. As above, a location-specific distribution profile is first acquired at step 802 and compared with a designated baseline profile at step 804 to extract a location-specific signature at step 806. From this signature, one or more signal strength criteria are defined at step 808 for use in characterizing future device visits. Again, a signature discriminating power or confidence metrics may be optionally defined at step 810 to further qualify device visit characterizations and/or partake in downstream classification processes, as will be described below.

In this particular example, however, device profiling 850 is implemented as a function of signal strength and visit duration characterisations. Namely, a device may be characterized as a walk-in or walk-by based on either or both of qualifying signal strength measurement(s) and visit duration value. Accordingly, one or more device transmissions are first detected (and potentially recognized from previous visits) at step 852. In a device first profiling stream, a signal strength of the detected transmissions is measured at step 854 and compared at step 856 with designated signal strength criteria to output a signal strength classification 858 of the detected device as one of a walk-in and walk-by visitor. Where confidence metrics are available, either as representative of a discriminating power of the location signature and/or as reflective of confidence intervals or the like usable in comparatively evaluating an accuracy or reliability of signal strength classifications, such confidence metrics may be applied to the signal strength classification.

A second device profiling stream concurrently tracks, in this example, a visit duration at step 870, for instance as discussed above with reference to FIG. 2. A tracked visit duration value is then compared at step 872 with a designated duration threshold or other such duration-specific criteria to output at step 874 a duration classification identifying the detected device as representative of one of a walk-in or a walk-by visitor. Local duration and signal strength classifications are then combined at step 876, for example based on one or more preset rules, to output a global classification 878. In one example, where both classification techniques agree with same output classification, the detected device may be more reliably identified as a walk-in vs. walk-by visitor. Where respective classifications disagree, then different rules may be applied to resolve into a single global output. For example, in some embodiments, or in respect of some locations where a signal strength is deemed to manifest a particularly strong discriminating power, the signal strength classification may be set to trump any disagreements with the duration classifier. Alternatively, a confidence level associated with the signal strength classifier may rather serve to set a weight to the signal strength classifier that can be used when compiling a global output. Similarly, a confidence level or interval may be associated with the duration classifier, for instance where a visit duration deviates only slightly from a prescribed threshold or the like.

Figure 13:
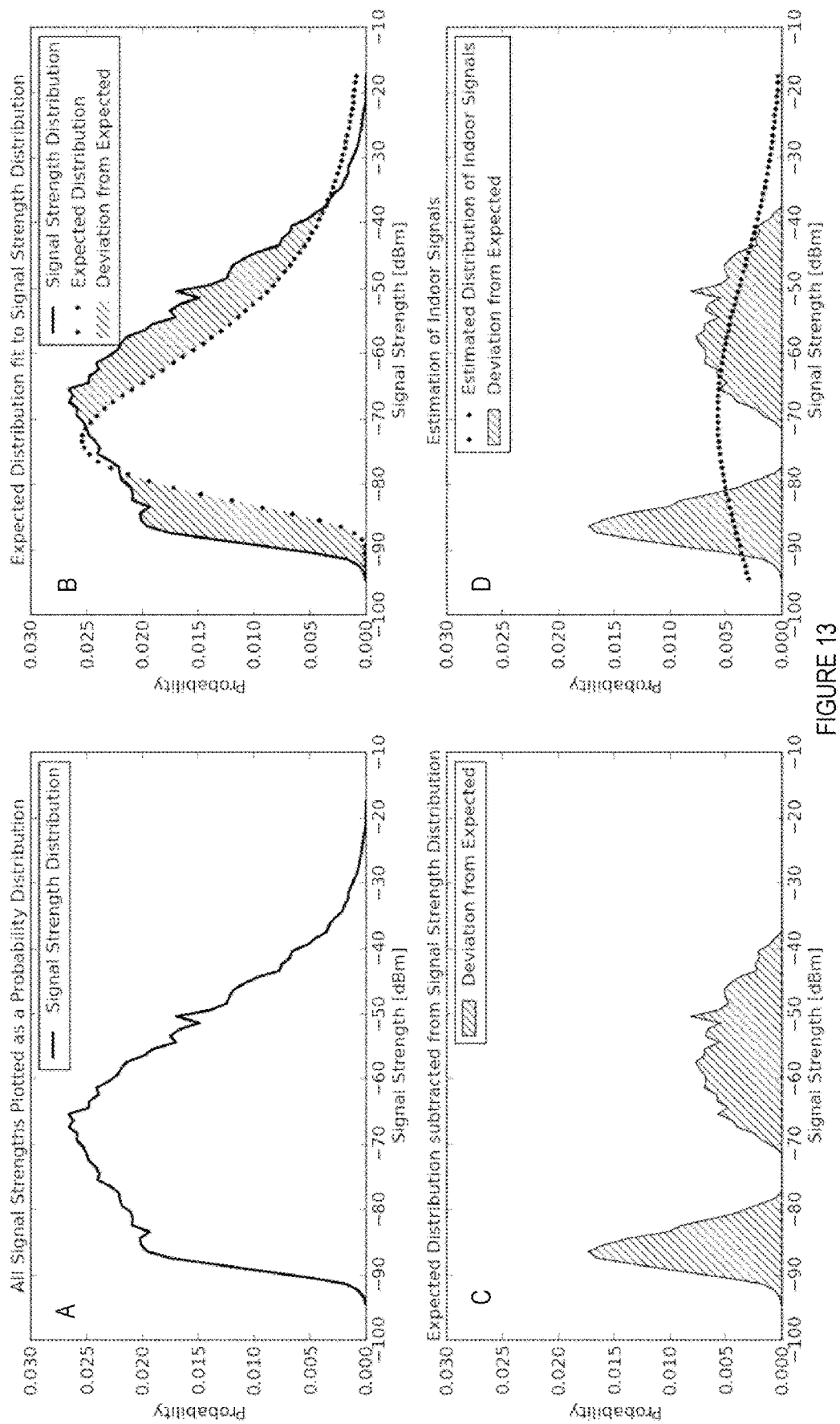

With reference to the examples of FIGS. 9 to 14, one readily appreciates those locations most likely to produce reliable signal strength criteria, from those more likely to rely on duration metrics to, if not guide, weigh significantly in the global classification of visiting devices. Namely, the processed location-specific distribution signatures (C) of FIGS. 9 to 12 clearly exhibit a bimodal distribution, if not immediately discernible in the raw signal strength distribution (A), which can be accurately fitted with a normal distribution in automatically defining reliable signal strength classification criteria. In the example of FIG. 13, however, while signature extraction clearly allows for identification of a bimodal signature distribution (C) from an otherwise unrevealing original distribution (A), the fitting of a normal distribution to the resulting signature proves less than ideal, though nonetheless usable in producing discriminating results. In this situation, the awkward fit in the final signature processing step may yield a lower confidence level in the discriminating power of the output signal strength criteria, and thus, a global output may rely more heavily on concurrent visit duration classifications.

Figure 14:
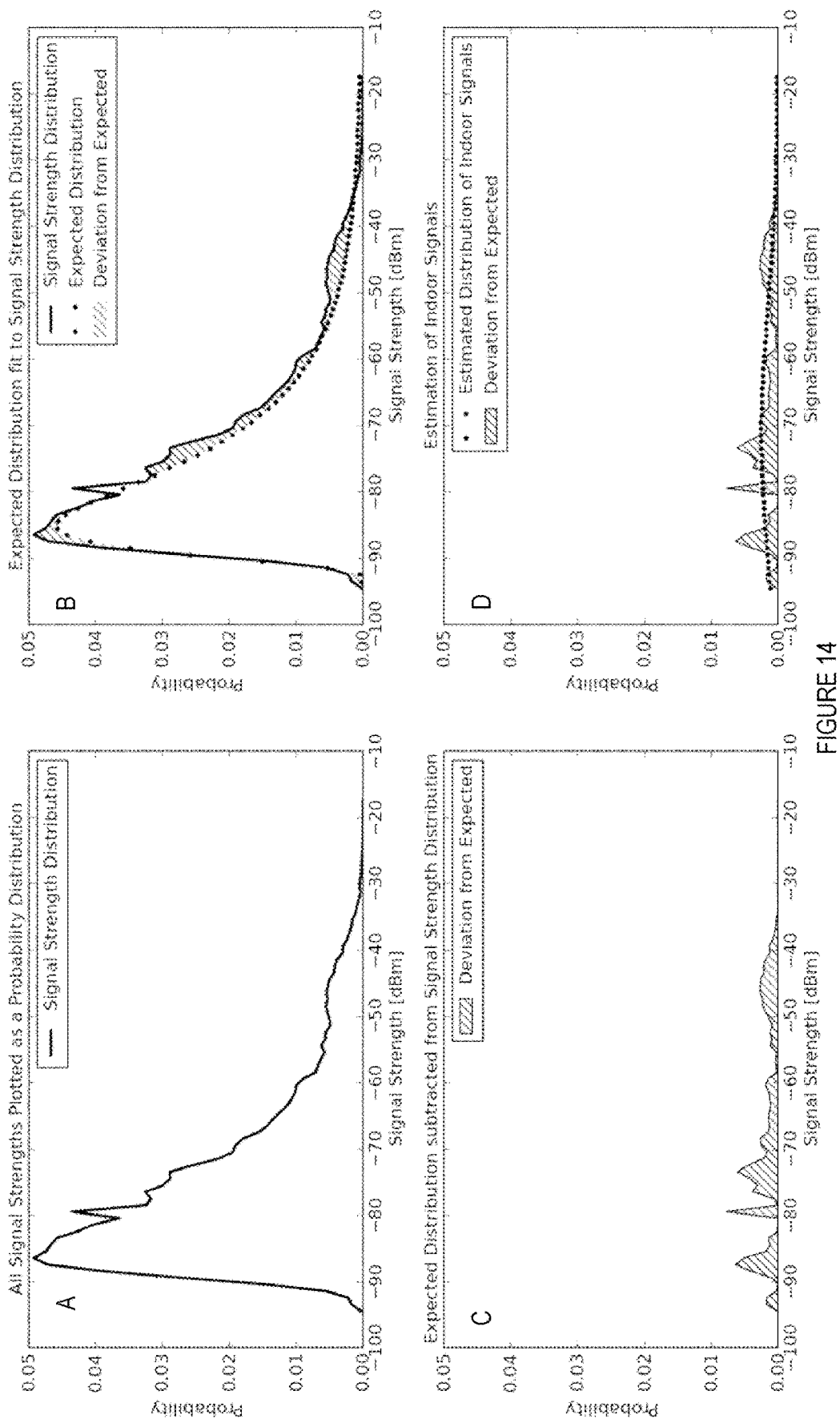

In the example of FIG. 14, which represents data acquired from an open-air coffee shop devoid of physical boundaries, signal strength characterization becomes less reliable and thus, in the context of such locations, visit duration may be more reliably utilised to distinguish walk-in vs. walk-by visitors.

In the approach described above, a single radio receiver may be used to accurately distinguish between devices having entered or crossed location boundaries, and those that have merely passed by the location without crossing this boundary, and that, for a variety of location configurations and permutations. That being said, while a single radio may suffice to achieve reasonably accurate results in most locations and configurations, two or more receivers may also be used concurrently to improve performance.

Similarly, while location profiling may be implemented once for a given installation, location profiling may also be repeated periodically, or again upon reconfiguration of a given location layout or installation, to ensure accurate results. In one embodiment, location profiling may be implemented remotely, whereby signal strength data is acquired and transmitted for central processing over a designated period of time, and the signal strength classification criteria automatically calculated by the central processor and updated for subsequent application to downstream visit profiling.

Reference will now be made to the specific data processing characteristics used in producing the profiles shown in FIGS. 9 to 14. In this example, a large sample of signal strengths, X, is read from a given location radio (a single radio in this example). The signal strengths are then combined into a normalized histogram, as plotted for example at FIG. 9A.

Let P(x) be the relative probability of signal strength $x \in X$. Let $Z = X - \min X$ and $F(x) = P(x + \min X)$. Then $F(z)$ is a translation of $P(x)$ and $z \geq 0 \forall z \in Z$.

Using a weighted ordinary least squares, a baseline distribution $f(z)$ is fitted to the location-specific distribution profile by finding the parameters $\mu$ and $\lambda$ in the flowing equation such that $f(z) \lesssim F(z)$ (e.g. see FIG. 9B).

$$f(z; \mu, \lambda) = \left[\frac{\lambda}{2\pi z^3}\right]^{1/2} e^{\frac{-\lambda(z-\mu)^2}{2\mu^2 z}}$$

To extract the location signature G(z), the fitted baseline function $f(z)$ is compared (e.g. subtracted) from F(z) such that $G(z) \approx F(z) - f(z)$ (i.e. see FIG. 9C).

A normal distribution, in this example, is then fitted (i.e. see FIG. 9D) to the extracted signature by finding the parameters a, b, and c such that:

$$g(z; a, b, c) \approx a e^{\frac{(x-b)^2}{2c^2}}$$

From the fitted normal distribution, the value b+min X can be used as an estimate for the average signal strength for devices inside the location.

In the above example, $f(z)$ was selected to represent a variant of a Tweedy distribution, again based on a free-space distribution characteristic to known open-space hotspot locations. The skilled artisan will appreciate that other baseline distributions can be used to achieve similar results, and therefore, the general scope of the disclosure is not intended to be limited to this specific example. Furthermore, while a single Gaussian distribution is used to extract classification criteria from the resulting location signature, other distribution function may be used, as can other distribution analysis techniques used to define appropriate classification criteria. For instance, a bimodal distribution function may result in greater versatility, for instance possibly yielding higher confidence metrics than otherwise available via a single Gaussian fitting (e.g. see example of FIG. 14). For instance, a bimodal distribution function fitted to the extracted deviation may provide greater accuracy in evaluating a bimodality of the extracted deviation, which may in some embodiments and/or contexts, provide more accurate confidence metrics to be associated with output results. For example, alternative metrics may qualify and/or quantify a bimodality of the extracted deviation, and thus provide insight as to the efficacy of the applied technique to a particular context or data set.

While the present disclosure describes various exemplary embodiments, the disclosure is not so limited. To the contrary, the disclosure is intended to cover various modifications and equivalent arrangements included within the general scope of the present disclosure.

The invention claimed is:

1. A method for automatically characterizing a visit of a wireless device at or near a wireless hotspot location via a receiver operated within the location, comprising:
   detecting one or more wireless transmissions from the wireless device via the receiver operated at the wireless hotspot location;
   extracting a unique device identifier from each of said one or more wireless transmissions;
   tracking a visit profile of the wireless device via said unique device identifier;
   processing said visit profile against one or more preset visit characterization criteria defined for the wireless hotspot location to discriminate between two or more designated visit classifications; and
   characterizing the visit as being consistent with one of said designated visit classifications based on said processing;
   wherein said one or more visit characterization criteria comprise a device proximity criteria defined so to discriminate between walk-in visitors and walk-by visitors;
   the method further comprising:
   processing a signal strength of said one or more wireless transmissions against a preset signal strength signature of the hotspot location defined by a set of signal strengths associated with a set of multiple previous wireless transmissions received from multiple wireless devices via the receiver at the hotspot location so to discriminate between wireless devices operated from within a physical boundary of the location, from those operated outside the physical boundary; and
   characterizing the visit as representative of one of a walk-in visitor and a walk-by visitor as a function of said signal strength processing;
   wherein establishment of said preset signal strength signature comprises:
      recording said set of signal strengths from said multiple previous wireless transmissions detected by the receiver at the location;
      producing a signal strength distribution for the wireless location based on said set;
      identifying, from said distribution, signal strengths predominantly associated with devices operated from within the physical boundary; and
      defining said preset signal strength signature as a function of said identified signal strengths; and
   wherein said identifying comprises:
      comparing said produced signal strength distribution with a designated free-space baseline distribution to identify a deviation therefrom characteristic of the location, said designated free-space baseline distribution consisting of an estimated unobstructed signal strength distribution, and wherein said deviation is representative of at least one of a physical layout at the location and the physical boundary; and
      identifying from said deviation said signal strengths predominantly associated with devices operated from within the physical boundary.

2. The method of claim 1, wherein the method further comprises:
   recording respective timestamps in said visit profile for said one or more wireless transmissions;
   associating a visit duration value with said visit profile based on said respective timestamps; and
   characterizing the visit as being consistent with one of two or more visit duration classifications based on said visit duration value.

3. A method for automatically identifying a wireless device as being physically located at a Wi-Fi location and within or outside a physical boundary at least partially defining this location, the method comprising:
   detecting a wireless transmission from the wireless device via a receiver operated within the physical boundary;
   processing a signal strength of said wireless transmission against a preset signal strength signature of the location defined by a set of signal strengths associated with a set of multiple previous wireless transmissions received from multiple wireless devices via the receiver at the hotspot location and defining one or more signal strength criteria for discriminating between signal strengths predominantly associated with devices operated from within the physical boundary, from those predominantly associated with devices operated outside the physical boundary; and
   identifying the device as being within or outside the physical boundary based on said processing;
   wherein said signal strength signature is defined by:
      recording said set of signal strengths from said multiple previous wireless transmissions detected by the receiver at the location;
      producing a signal strength distribution for the location based on said set;
      identifying, from said distribution, signal strengths predominantly associated with devices operated from within and/or outside the location; and
      defining said signal strength criteria based on said identified signal strengths;
   wherein said identifying comprises:
      comparing said produced signal strength distribution with a designated free-space baseline distribution to identify a deviation therefrom characteristic of the location, said designated free-space baseline distribution consisting of an estimated unobstructed signal strength distribution, and wherein said deviation is representative of at least one of a physical layout at the location and the physical boundary; and
      discriminating from said deviation said signal strengths predominantly associated with devices operated from within the location, from those operated from outside the location.

4. The method of claim 3, wherein said discriminating from said deviation comprises fitting a distribution curve to said deviation and extracting therefrom curve parameters representative of said signal strengths predominantly associated with devices operated from within the physical boundary.

5. The method of claim 3, wherein said comparing comprises fitting said produced signal strength distribution with a designated free-space baseline distribution function, and comparing said fitted free-space baseline distribution function with said produced signal strength distribution to identify said deviation.

6. A system for automatically classifying wireless device visits at or near a wireless hotspot location, comprising:
   a receiver operated from within the wireless hotspot location;
   a data storage device; and a data processor operable to:
- extract unique device identifiers from wireless transmissions received by said receiver from wireless devices operated at or near the hotspot location;
- track, in said data storage device, respective visits from each of said wireless devices via said extracted unique device identifiers;
- record, in said data storage device, indication of a received signal strength for each of said tracked wireless devices; and
- classify each of said respective visits as a function of said indication;

wherein said processor is operable to compare each said received signal strength with a signal strength signature of the location defined by a set of signal strengths associated with a set of multiple previous wireless transmissions received from multiple wireless devices via the receiver at the hotspot location and defined to discriminate between signal strengths received from devices operated from within the location, and those operated from outside the location, and classify each of said respective visits as a function of said comparison;

wherein said data processor further operable, to define said signal strength signature, to:
- record said set of signal strengths from said multiple previous wireless transmissions detected by the receiver at the location;
- produce a signal strength distribution for the location based on said set;
- identify, from said distribution, signal strengths predominantly associated with devices operated from within and/or outside the location; and
- define said signal strength criteria based on said identified signal strengths;

wherein to identify, the data processor further is operable to:
- compare said produced signal strength distribution with a designated free-space baseline distribution to identify a deviation therefrom characteristic of the location, said designated free-space baseline distribution consisting of an estimated unobstructed signal strength distribution, and wherein said deviation is representative of at least one of a physical layout at the location and the physical boundary; and
- discriminate from said deviation said signal strengths predominantly associated with devices operated from within the location, from those operated from outside the location.

7. The system of claim 6, wherein said processor is further operable to compare a respective visit duration with a duration threshold stored in said data storage device, and classify each of said respective visits as a function of said comparison.

8. The system of claim 6, wherein said processor comprises at least one packet listener to extract said unique device identifiers.

9. The system of any one of claim 6, wherein said processor comprises at least one Real Time Tracking System (RTLS) processor to extract said unique device identifiers and to further detect said received signal strength.

10. The system of claim 6, wherein said receiver consists of a single receiver.

11. A non-transitory computer-readable medium having statements and instructions stored therein for implementation by a processor to automatically discriminate between wireless signals received by a Wi-Fi receiver operated at a location from wireless devices operated from within a physical boundary at least partially defining this location, from those wireless devices operated from outside the physical boundary, by:
- receiving as input a signal strength value associated with a given wireless transmission;
- comparing said signal strength value against a preset signal strength signature of the location defined by a set of signal strength values associated with a set of multiple previous wireless transmissions received from multiple wireless devices via the receiver at the hotspot location and defining a signal strength criteria for discriminating between signal strengths predominantly associated with devices operated from within the physical boundary, from those predominantly associated with devices operated from outside the physical boundary; and
- identifying said given wireless transmission has having been transmitted from a device operated from within or outside the physical boundary based on said comparing;

wherein said signal strength signature is defined by:
- recording said set of signal strengths from said multiple previous wireless transmissions detected by the receiver at the location;
- producing a signal strength distribution for the location based on said set;
- identifying, from said distribution, signal strengths predominantly associated with devices operated from within and/or outside the location; and
- defining said signal strength criteria based on said identified signal strengths;

wherein said identifying comprises:
- comparing said produced signal strength distribution with a designated free-space baseline distribution to identify a deviation therefrom characteristic of the location, said designated free-space baseline distribution consisting of an estimated unobstructed signal strength distribution, and wherein said deviation is representative of at least one of a physical layout at the location and the physical boundary; and
- discriminating from said deviation said signal strengths predominantly associated with devices operated from within the location, from those operated from outside the location.

* * * * *